United States Patent
Yaghoubi et al.

(10) Patent No.: US 12,420,776 B2
(45) Date of Patent: Sep. 23, 2025

(54) TRAJECTORY GENERATION UTILIZING DIVERSE TRAJECTORIES

(71) Applicant: Motional AD LLC, Boston, MA (US)

(72) Inventors: Shakiba Yaghoubi, Cambridge, MA (US); Calin Belta, Sherborn, MA (US); Noushin Mehdipour, Allston, MA (US); Anne Collin, Cambridge, MA (US); Radboud Duintjer Tebbens, Newton Center, MA (US)

(73) Assignee: Motional AD LLC, Boston, MA (US)

( * ) Notice: Subject to any disclaimer, the term of this patent is extended or adjusted under 35 U.S.C. 154(b) by 174 days.

(21) Appl. No.: 17/970,957

(22) Filed: Oct. 21, 2022

(65) Prior Publication Data
US 2024/0042993 A1     Feb. 8, 2024

Related U.S. Application Data

(60) Provisional application No. 63/370,472, filed on Aug. 4, 2022.

(51) Int. Cl.
  *B60W 30/08*     (2012.01)
  *B60W 50/00*     (2006.01)
  *B60W 60/00*     (2020.01)

(52) U.S. Cl.
  CPC ........ *B60W 30/08* (2013.01); *B60W 50/0097* (2013.01); *B60W 60/001* (2020.02); *B60W 2554/20* (2020.02); *B60W 2754/20* (2020.02)

(58) Field of Classification Search
  CPC .... B60W 30/08; B60W 30/095; B60W 30/10; B60W 50/0097; B60W 60/001;
  (Continued)

(56) References Cited

U.S. PATENT DOCUMENTS 11,358,598 B2 *   6/2022   Hartnett ............ B60W 60/0027
11,702,106 B1 *   7/2023   Poubel Orenstein ........................
                                                       G05D 1/0088
                                                             701/26
(Continued)

FOREIGN PATENT DOCUMENTS

GB            2601841 A      6/2022
GB            2602194 A      6/2022
(Continued)

OTHER PUBLICATIONS

Great Britain Office Action issued for Application No. GB 2300776.8, dated Jul. 12, 2023.
(Continued)

*Primary Examiner* — Andrew R Dyer
(74) *Attorney, Agent, or Firm* — Knobbe, Martens, Olson & Bear, LLP

(57) ABSTRACT

Provided are methods for trajectory generation based on a hierarchical plurality of rules using diverse trajectories, which can include generating a first set of trajectories for a vehicle from a first pose, identifying a first trajectory and a second trajectory from the first set of trajectories, generating a second set of trajectories for the vehicle from a second pose and a third set of trajectories for the vehicle from a third pose, identifying a third trajectory based at least in part on the second set of trajectories and the third set of trajectories, the third trajectory violating a first behavioral rule associated with a first priority that is less than a priority of behavioral rules violated by other trajectories, and determining a path for the vehicle based at least in part on the third trajectory. Systems and computer program products are also provided.

22 Claims, 15 Drawing Sheets

(58) Field of Classification Search
CPC ......... B60W 60/0011; B60W 60/0015; B60W 2554/20; B60W 2754/20; B60W 2050/009; B60W 2050/005; B60W 40/10
USPC .......................................................... 701/26
See application file for complete search history.

(56) References Cited

U.S. PATENT DOCUMENTS

| | | | |
|---|---|---|---|
| 12,187,293 B1* | 1/2025 | Semple | B60W 30/08 |
| 2012/0245817 A1* | 9/2012 | Cooprider | B60W 30/143 |
| | | | 701/1 |
| 2017/0083021 A1* | 3/2017 | Balaghiasefi | G08G 1/163 |
| 2018/0141544 A1* | 5/2018 | Xiao | G01C 21/3469 |
| 2020/0110416 A1* | 4/2020 | Hong | G05D 1/0221 |
| 2020/0192391 A1 | 6/2020 | Vora et al. | |
| 2020/0356951 A1* | 11/2020 | Cristache | G06Q 10/10 |
| 2022/0048535 A1* | 2/2022 | Niendorf | G01C 21/165 |
| 2022/0176995 A1* | 6/2022 | Subramanian | B60W 30/08 |
| 2022/0185289 A1* | 6/2022 | Arora | B62D 15/0255 |
| 2022/0187837 A1* | 6/2022 | Tebbens | B60W 40/10 |
| 2022/0194419 A1* | 6/2022 | Houshmand | B60W 60/0023 |
| 2022/0198096 A1* | 6/2022 | Danna | G06F 11/3688 |
| 2022/0219726 A1* | 7/2022 | Yadmellat | B60W 60/0011 |
| 2022/0221294 A1* | 7/2022 | Kumar | G08G 1/0112 |
| 2023/0132512 A1* | 5/2023 | Clawson | B60W 60/0027 |
| | | | 701/26 |

FOREIGN PATENT DOCUMENTS

| | | |
|---|---|---|
| GB | 2614579 A | 7/2023 |
| WO | WO 2020/245769 A1 | 12/2020 |
| WO | WO 2021/122857 A1 | 6/2021 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2300776.8, dated Jul. 29, 2024.

Censi, A. et al., "Liability, Ethics, and Culture-Aware Behavior Specification Using Rulebooks," 2019 International Conference on Robotics and Automation (ICRA), Feb. 2019, in 10 pages. URL: https://arxiv.org/pdf/1902.09355.

Collin, A. et al., "Safety of the Intended Driving Behavior Using Rulebooks," 2020 IEEE Intelligent Vehicles Symposium (IV), Oct. 2020, in 8 pages. URL: https://arxiv.org/pdf/2105.04472.

Great Britain Office Action issued for Application No. GB 2300776.8, dated Feb. 25, 2025.

* cited by examiner

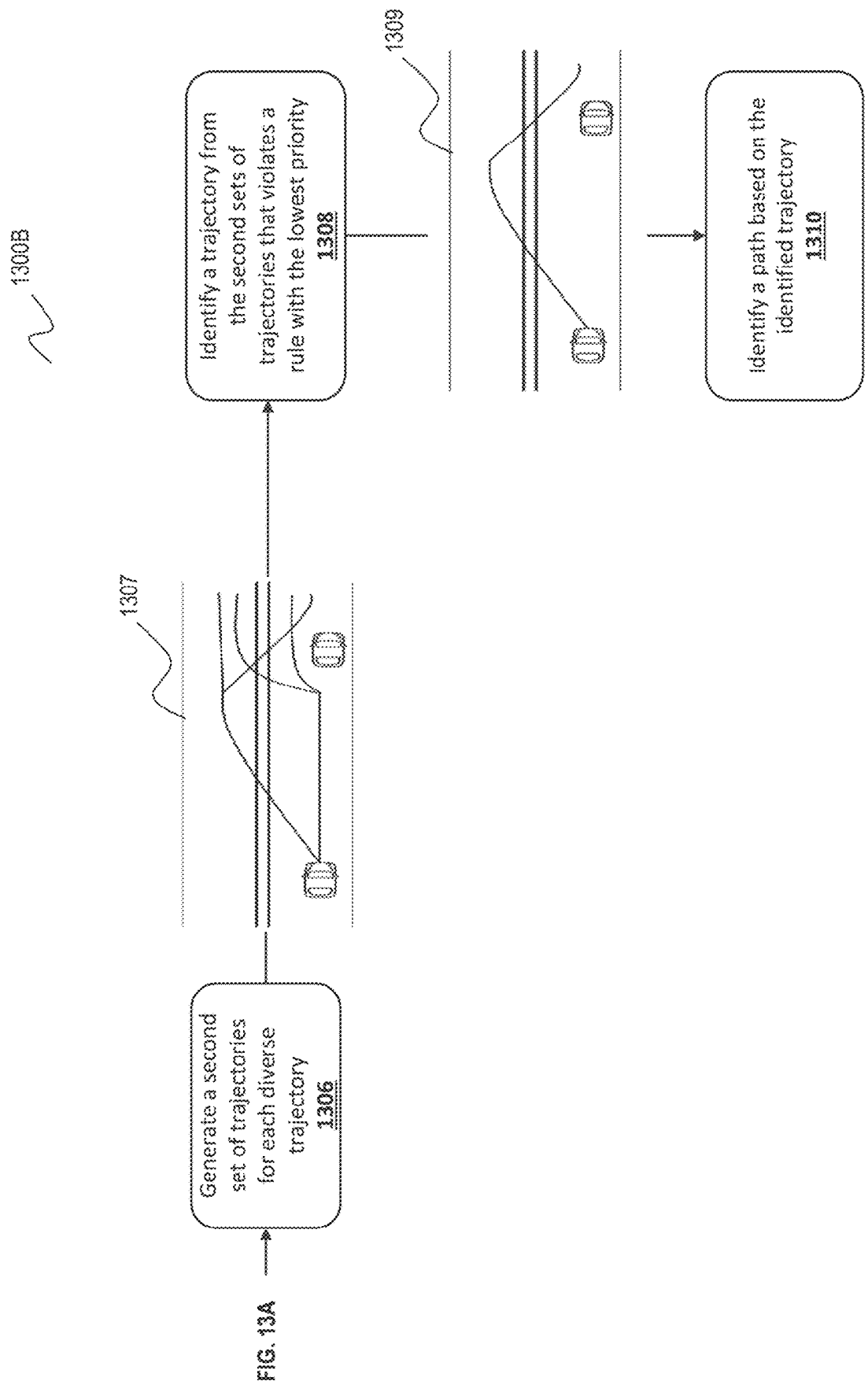

US 12,420,776 B2

TRAJECTORY GENERATION UTILIZING DIVERSE TRAJECTORIES

RELATED APPLICATIONS

This application claims priority under 35 U.S.C. § 119(e) to U.S. Provisional Patent Application No. 63/370,472, filed Aug. 4, 2022 and entitled "TRAJECTORY GENERATION UTILIZING DIVERSE TRAJECTORIES," which is incorporated herein by reference in its entirety.

BACKGROUND

Self-driving vehicles typically use many decisions during operation. Executing the decisions can be difficult and complicated.

BRIEF DESCRIPTION OF THE FIGURES

FIG. 13B is a flow diagram illustrating an example trajectory selection;

DETAILED DESCRIPTION

Figure 1:
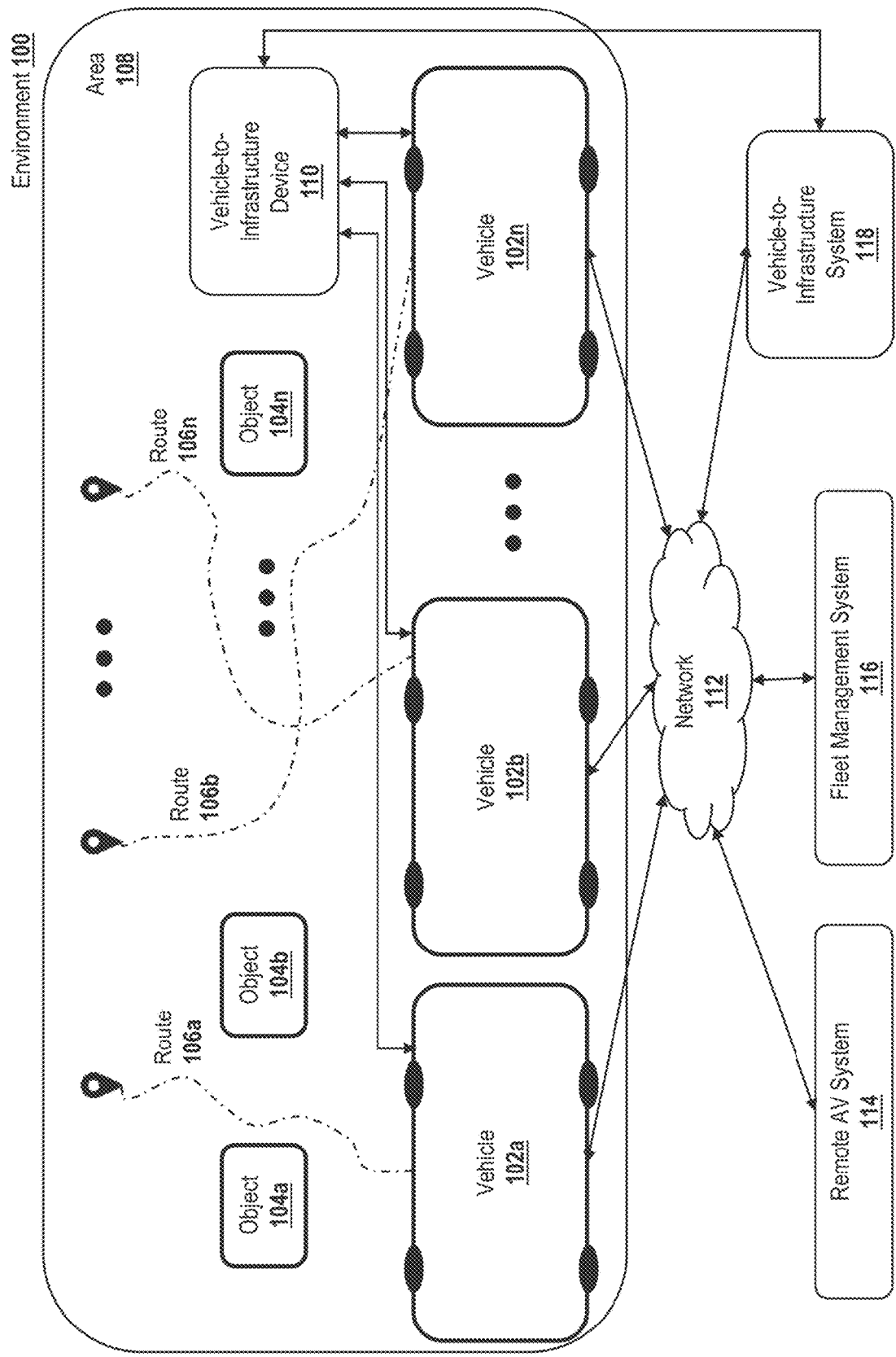
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that selects a trajectory for a vehicle (e.g., an autonomous vehicle) using trajectory generation based on a hierarchical plurality of rules. The signal processing system can receive location data that identifies a source and/or destination of the vehicle within an environment. The vehicle can navigate the environment in accordance with a route. For example, the vehicle can navigate the environment by navigating from a source to a destination using a route. The route may be based on different combinations of trajectories or paths between poses. A combination of trajectories may cause navigation from the source to the destination, however, combinations of trajectories may result in different paths. To build the path for the vehicle, the signal processing system can select a set of trajectories for the path. For example, the signal processing system can select a first trajectory for the vehicle from a first pose to a second pose in a first planning step, a second trajectory for the vehicle from the second pose to a third pose in a second planning step, etc. The signal processing system can identify a first set of trajectories for the vehicle in a first planning step. The signal processing system can identify a set of diverse trajectories of the first set of trajectories. The signal processing system can identify additional sets of trajectories from a pose at the end of a diverse trajectory of the set of diverse trajectories. The signal processing system can select a trajectory from the additional sets of trajectories that violates a behavioral rule of a hierarchical plurality of rules with a lowest priority compared to other rules in a second planning step. Based on the selected trajectory, the signal processing system can determine a path for the vehicle. As a non-limiting example, the signal processing system maintains multiple, diverse trajectories at an initial planning step for building a path and selects a trajectory at a subsequent planning step from a plurality of trajectories that are based on the multiple, diverse trajectories maintained at the initial planning step.

By virtue of the implementation of systems, methods, and computer program products described herein, a system can generate a path for a vehicle that includes a trajectory for a particular planning step that violates a rule with a higher priority than another trajectory of the same planning step based on the rules violated by trajectories of other planning steps. The system can maintain a set of diverse trajectories in a first planning step and branch a new set of trajectories from the set of diverse trajectories. The system can select a trajectory from the new set of trajectories that violates a rule with a lower priority than other rules violated by other trajectories from the new set of trajectories. For example, the system may generate a path that includes a trajectory in a first planning step that violates a rule with a higher priority than a priority of another rule violated by another trajectory in the first planning step and a trajectory in a second planning step that violates a rule with a lower priority than a priority of other rules violated by other trajectories in the second planning step. Therefore, the system can more accurately generate a path that satisfies a hierarchical plurality of rules. Based on the generated path, the system can more accurately and efficiently perform automated vehicle testing to improve automated vehicle driving behavior. In some cases, the system can generate a path for a vehicle, in real time, by identifying a set of diverse trajectories and avoiding similar trajectories that may be of similar quality The use of a set of diverse trajectories enables the system to avoid trajectories that may be optimal in the short term, but not in the long term. Such a trajectory selection can improve the quality and performance of the vehicle.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
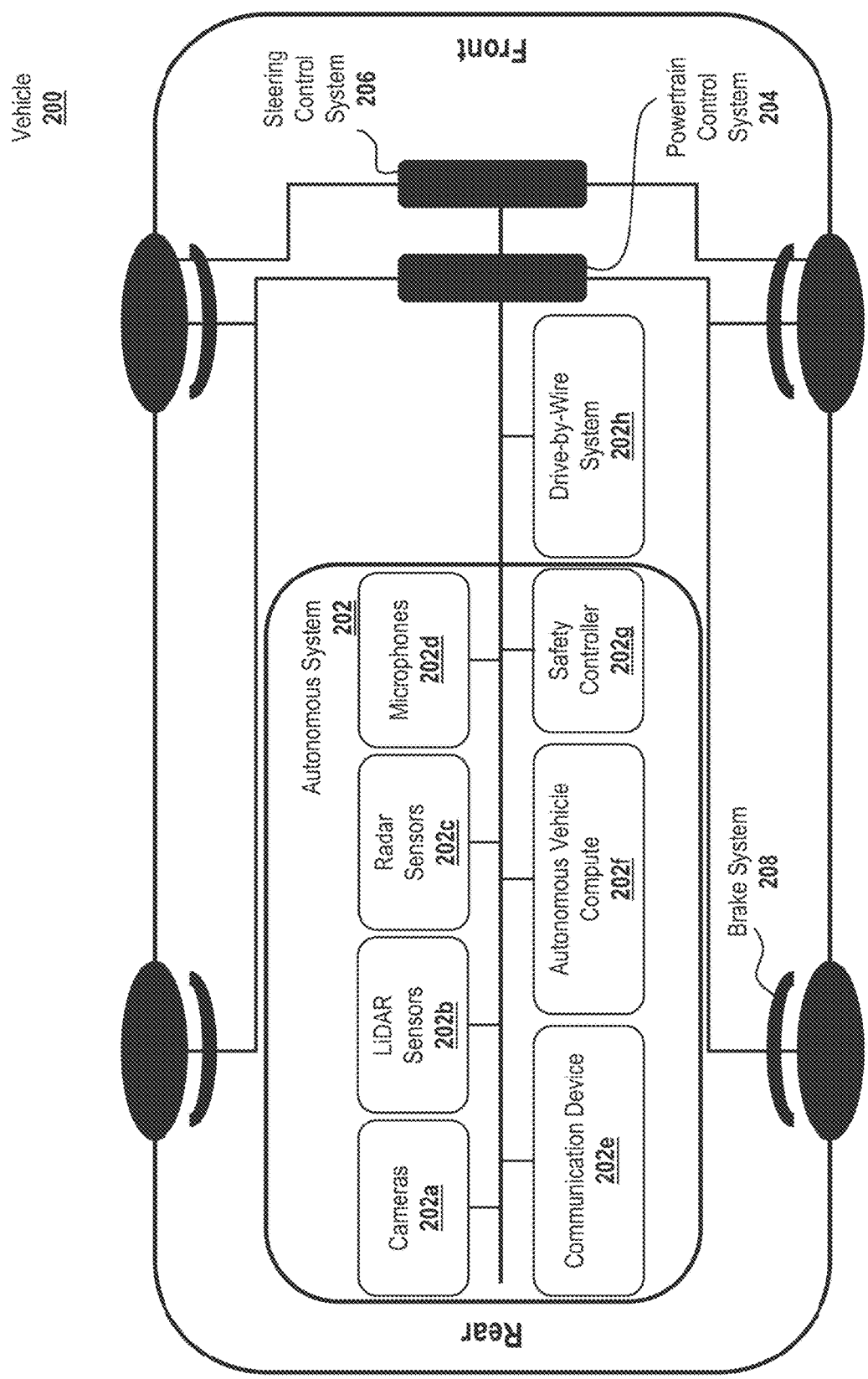
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
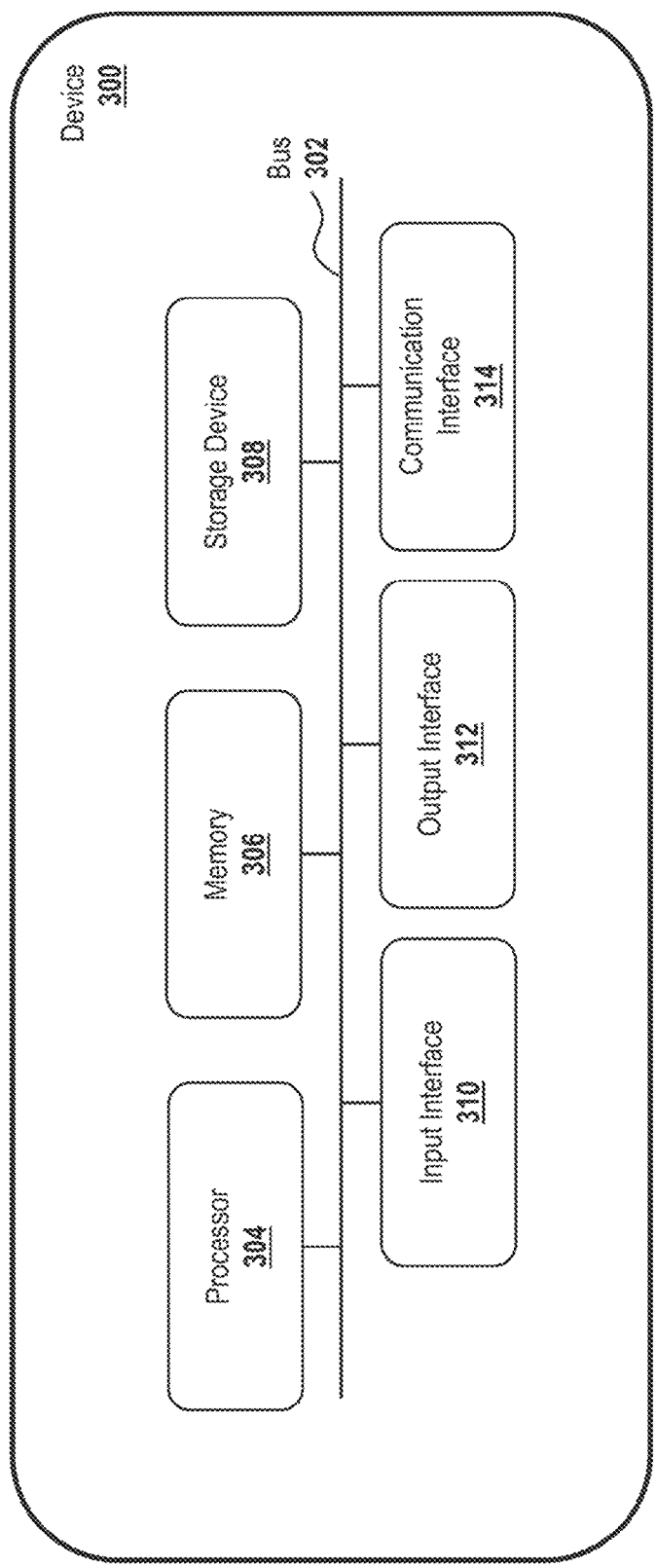
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, of 62 a coaxial interface, an infrared interface, a radio frequency (RF) interface, an universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
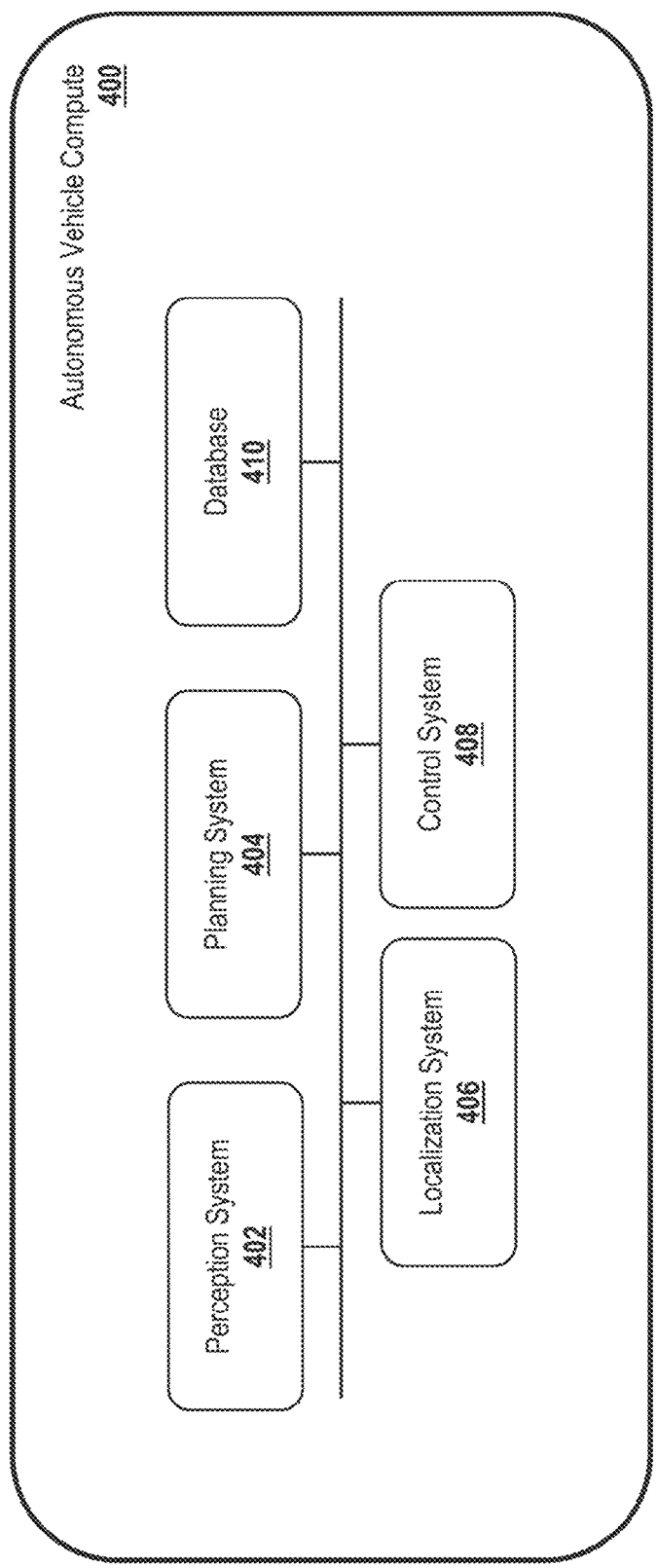
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
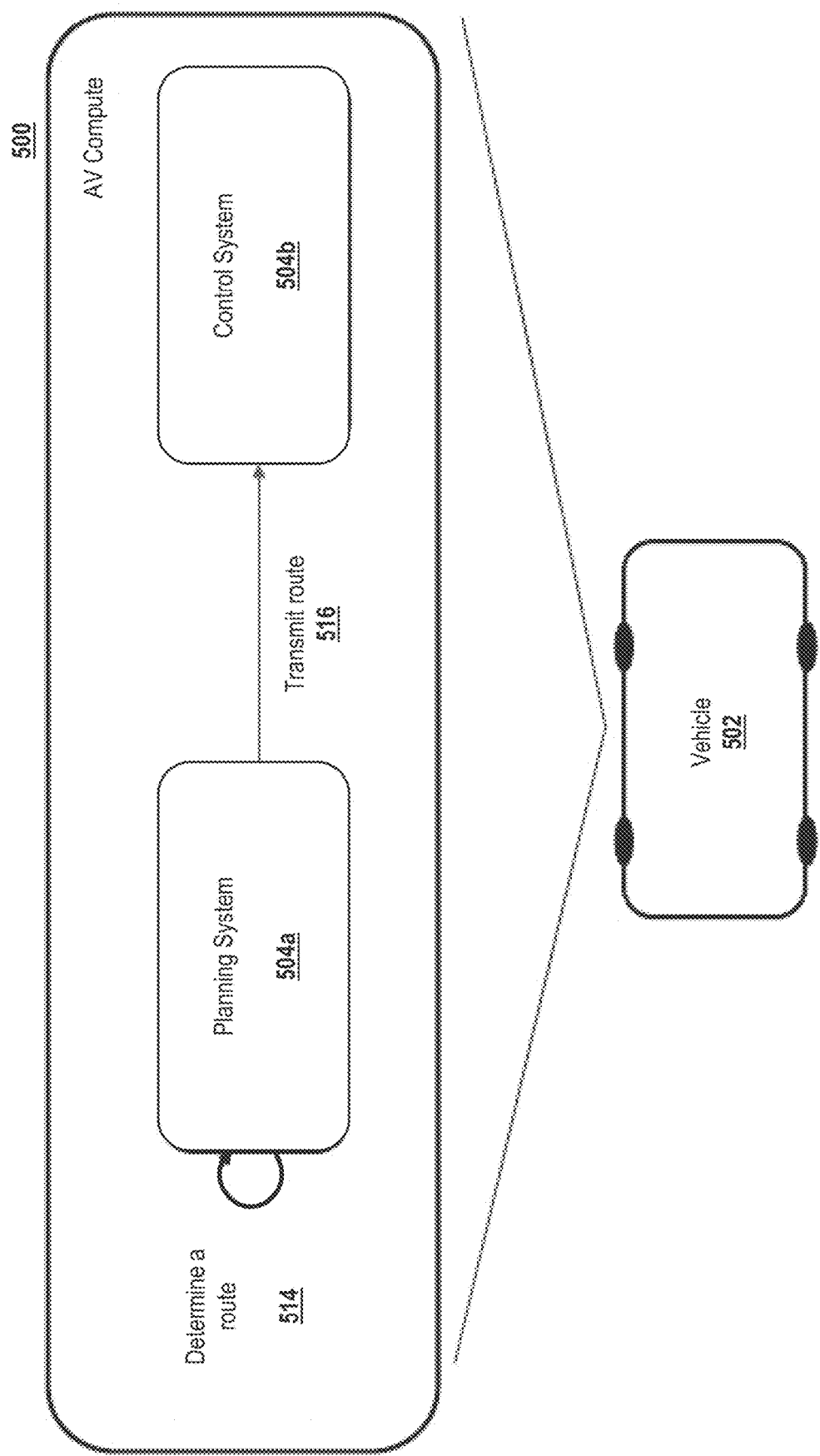
FIG. 5 are diagrams of an implementation of a process for graph exploration for trajectory generation based on a hierarchical plurality of rules.

Referring now to FIG. 5, illustrated is a diagram of an implementation 500 of a process for graph exploration for trajectory generation based on a hierarchical plurality of rules. In some embodiments, implementation 500 includes planning system 504a. In some embodiments, planning system 504a is the same as or similar to planning system 404 of FIG. 4. The output of a planning system 504a can be a route from a start point (e.g., source location or initial location) to an end point (e.g., destination or final location). In the example of FIG. 5, the planning system 504a determines the route at reference number 514 and transmits the route at reference number 516 to a control system 504b. During vehicle operation, the control system operates the vehicle to navigate the route. In some embodiments, the route and other AV compute data is stored for after-the fact evaluation of routes selected by the AV to navigate from a start point to an end point. Generally, the route is defined by one or more segments. For example, a segment is a distance to be traveled over at least a portion of a street, road, highway, driveway, or other physical area appropriate for automobile travel. In some examples, e.g., if the AV is an off-road capable vehicle such as a four-wheel-drive (4WD) or all-wheel-drive (AWD) car, SUV, pick-up truck, or the like, the route includes "off-road" segments such as unpaved paths or open fields.

The planning system 504a can output lane-level route planning data (in addition to or instead of the route). The lane-level route planning data can be used to traverse segments of the route based on conditions of a particular segment at a particular time. In some embodiments, the lane-level route planning data is stored for after-the-fact evaluation using graph exploration as described herein. During operation, the lane-level route planning data can be used to traverse segments of the route based on conditions of the particular segment at a particular time. For example, if the route includes a multi-lane highway, the lane-level route planning data includes trajectory planning data that the AV can use to choose a lane among the multiple lanes (e.g., based on whether an exit is approaching, whether one or more of the lanes have other vehicles, or other factors that vary over the course of a few minutes or less as the vehicle moves along a route). Similarly, in some implementations, the lane-level route planning data includes speed constraints specific to a segment of the route. For example, if the segment includes pedestrians or un-expected traffic, the speed constraints may limit the AV to a travel speed slower than an expected speed, e.g., a speed based on speed limit data for the segment.

Figure 6:
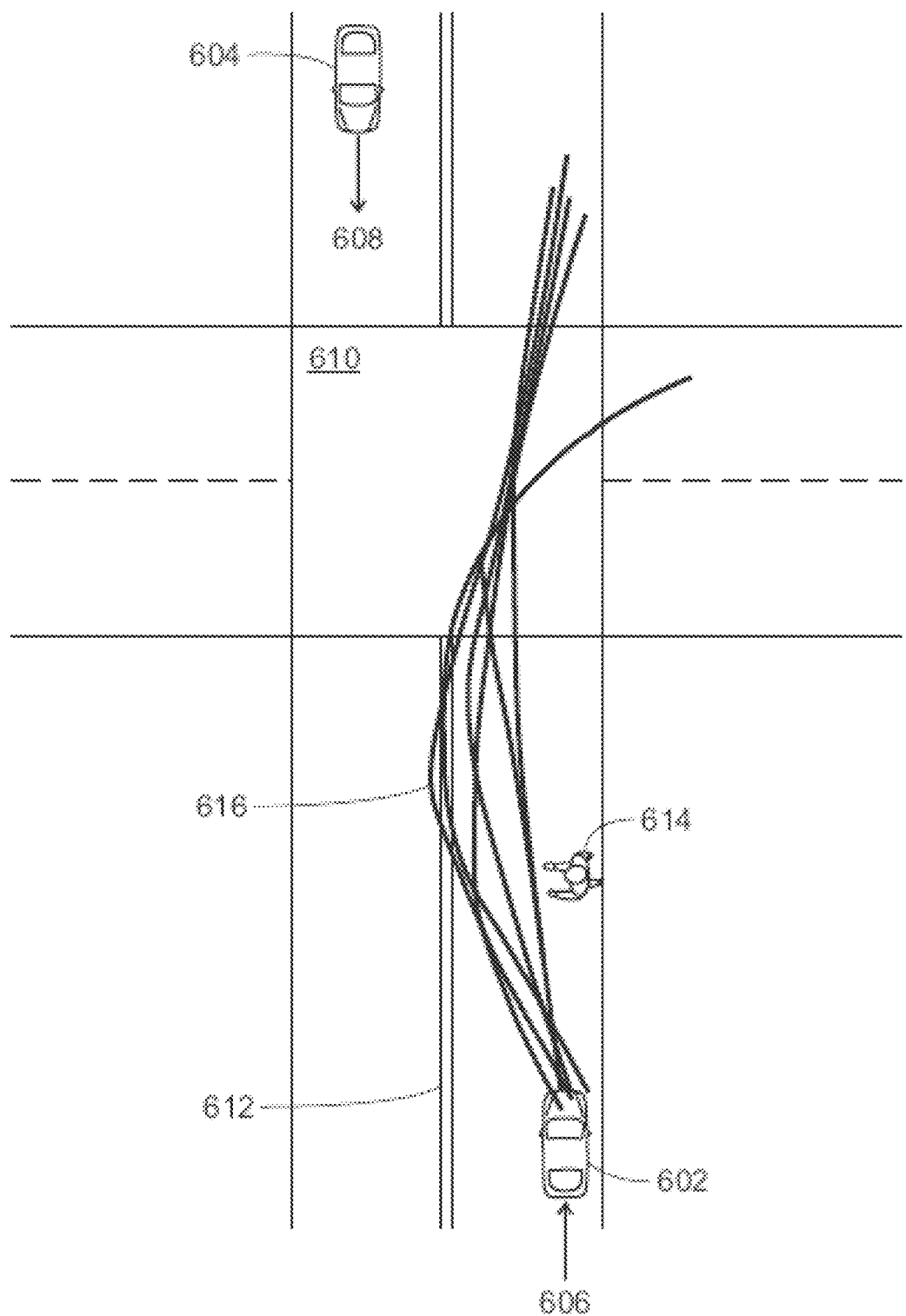
FIG. 6 illustrates an example scenario for autonomous vehicle operation using graph exploration with behavioral rule checks.

FIG. 6 illustrates an example scenario for AV 602 operation using graph exploration with behavioral rule checks, in accordance with one or more embodiments. The AV 602 may be, for example a vehicle 102 as illustrated and described in more detail with reference to FIG. 1 or a vehicle 200 as illustrated and described in more detail with reference to FIG. 2. The AV 602 operates in an environment 600, which may be an environment 100 as illustrated and described in more detail with reference to FIG. 1. In the example scenario illustrated in FIG. 6, the AV 602 is operating in lane 606 on approach to the intersection 610. Similarly, another vehicle 604 is operating in lane 608 on approach to the intersection 610. The flow of traffic in lane 606 is opposite to the flow of traffic in lane 608, as indicated by the arrows. There is a double line 612 separating lane 606 from lane 608. However, there is no physical road divider or median separating lane 606 from lane 608. The traffic rules in the environment 600 prohibit a vehicle from crossing the double line 612 or exceeding a predetermined speed limit (e.g., 45 miles per hour) in accordance with generally understood rules of the road.

The AV 602 is operating in the lane 606 to navigate to a destination beyond the intersection 610. As illustrated, a pedestrian 614 is located in the lane 606, blocking the lane 606. Other objects can block the AV's planned trajectory, such as incidents that block a lane of travel, vehicle breakdowns, construction, cyclists, and the like. In some embodiments, the AV 602 uses a perception system 402 to identify the objects, such as the pedestrian 614. The perception system 402 is illustrated and described in more detail with reference to FIG. 4. Generally, the perception system 402 classifies objects into types such as automobile, roadblock, traffic cones, etc. The classifications are provided to the planning system 404. The planning system 404 is illustrated and described in more detail with reference to FIG. 4.

The AV 602 determines that the lane 606 is blocked by the pedestrian 614. In examples, the AV 602 detects the boundaries of the pedestrian 614 based on characteristics of data points (e.g., sensor data) detected by the sensors 202 of FIG. 2. To reach the destination, a planning system 404 (FIG. 4) of the AV 602 generates the trajectories 616. Operating the AV 602 in accordance with one or more of the trajectories 616 causes the AV 602 to violate a traffic rule and cross the double line 612 to maneuver around the pedestrian 614 so that the AV 602 reaches its destination. Some of the trajectories 616 cause the AV 602 to cross the double line 612 and enter lane 608, in the path of the vehicle 604. The AV 602 uses a hierarchical plurality of rules (e.g., a hierarchical set of rules of operation) to provide feedback on the AV 602's driving performance. The hierarchical plurality of rules is sometimes referred to as a stored behavioral model or a rulebook. In some embodiments, the feedback is provided in a pass-fail manner. The embodiments disclosed herein detect when the AV 602 (e.g., the planning system 404 of FIG. 4) generates trajectories 616 that violate rules (e.g., behavioral rules), and determines whether the AV 602 could have generated an alternative trajectory that would have violated one or more lower-priority behavioral rules (e.g., behavioral rules with a lower priority than the trajectories 616 based on the hierarchical plurality of rules). The occurrence of such a detection denotes a failure of the motion planning process. The present techniques use graph exploration to heuristically determine a trajectory from the trajectories 616 that navigate past the pedestrian 614 in lane 606 and reaches a destination (e.g., goal). In some embodiments, the trajectory is a trajectory that begins at a starting pose and violates the behavioral rule with the lowest priority as compared to the priority of behavioral rules violated by other trajectories of the trajectories 616.

In some embodiments, at least one processor receives sensor data after the operation of the AV. The sensor data is representative of scenarios encountered by the AV while navigating through the environment. Hierarchical rules of the hierarchical plurality of rules are applied to scenarios simulated by an AV stack to modify and improve the AV development after-the-fact (e.g., after operation of the AV, where sensor data is captured). In examples, this offline framework is configured to develop a transparent and reproducible rule-based pass/fail evaluation of AV trajectories in test scenarios. For example, in an offline framework, a given trajectory output by the planning system 404 is rejected if a trajectory that leads to a lesser violation of the rule priority structure (e.g., a rule with a lower priority as compared to the priority of the rule violated by the trajectory) is found. The planning system is modified and improved based on, at least in part, the rejected trajectory and data associated with the rejected trajectory. In some embodiments, the present techniques receive a fixed set of trajectories generated after-the-fact from a given scenario and determines a particular trajectory to evaluate if the AV passes or fails a predetermined test. The present techniques use a set of fixed trajectories to create a graph. In some embodiments, the graph is an edge weighted graph and weights are assigned to edges that correspond to trajectories based on rule violations. Each trajectory can be associated with one or more costs, each cost corresponding to a rule violation. Determining the fixed set of trajectories is described with respect to FIG. 7.

Figure 7:
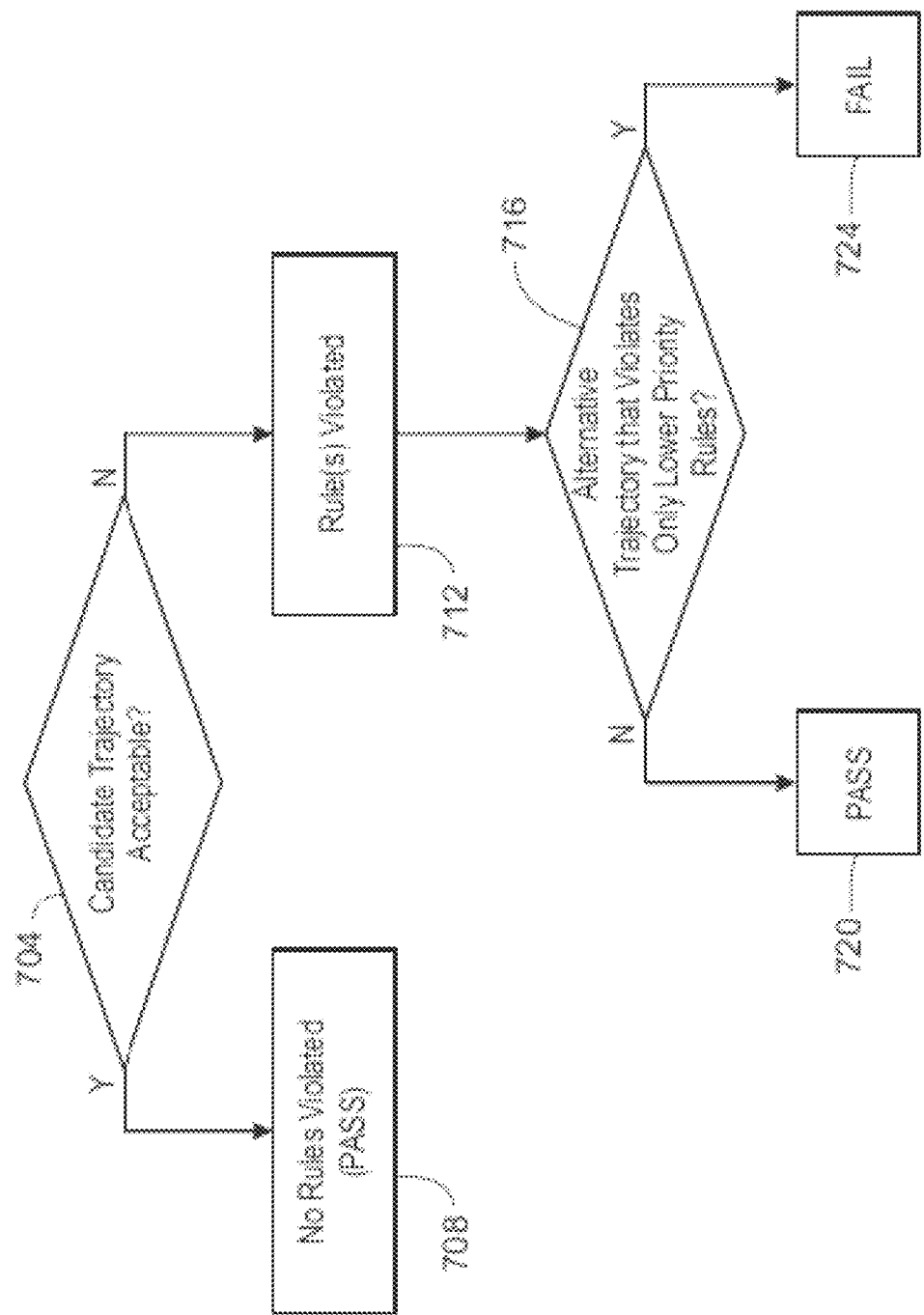
FIG. 7 illustrates an example flow diagram of a process for vehicle operation using behavioral rule checks to determine a fixed set of trajectories.

FIG. 7 illustrates an example flow diagram of a process 700 for vehicle operation using behavioral rule checks to determine a fixed set of trajectories. In some embodiments, the process of FIG. 7 is performed by the AV 200 of FIG. 2, the device 300 of FIG. 3, the AV compute 400 of FIG. 4, or any combinations thereof. In some embodiments, at least one processor located remotely from a vehicle performs the process 700 of FIG. 7. Likewise, embodiments may include different and/or additional steps, or perform the steps in different orders.

At block 704, it is determined that a trajectory (e.g., a trajectory trajectories 616) for the AV 602 is acceptable (e.g., whether the trajectory violates a rule of the hierarchical plurality of rules). The trajectories 616 and AV 602 are illustrated and described in more detail with reference to FIG. 6. In some examples, a trajectory is determined to be acceptable based on the hierarchical plurality of rules. If no rules are violated by the trajectory, the trajectory is acceptable and the process moves to step 708 and the planning system 404 and AV behavior pass the verification checks. The planning system 404 is illustrated and described in more detail with reference to FIG. 4.

If a rule is violated by the trajectory, the process moves to block 712 to determine the rule(s) violated by the trajectory. The violated rule is denoted as a first behavioral rule having a first priority. The process moves to block 716. At block 716, the processor determines whether an alternative trajectory is available for the AV 602 that violates a behavioral rule with a lower priority than the first priority. For example, the processor generates multiple alternative trajectories for the AV 602 based on sensor data associated with a scenario. In some embodiments, the sensor data characterizes information associated with the AV, information associated with the objects, information associated with the environment, or any combinations thereof. The processor identifies whether a second trajectory from the multiple alternative trajectories is available that violates a second behavioral rule of the hierarchical plurality of rules with a second priority that is less than the first priority (e.g., the second trajectory does not violate a behavioral rule with a priority that is greater than or equal to the first priority). In some examples, if no other trajectory is available that violates (e.g., only violates) a second behavioral rule with a priority lower than the first priority, the process moves to block 720 and the planning system 404 and AV behavior pass the verification checks. At block 716, if an alternative trajectory is available for the AV 602 that violates a behavioral rule with a lower priority than the first priority, the planning system 404 and AV behavior fail the verification checks.

In some examples, an AV is operable according to a hierarchical plurality of rules. Each behavioral rule has a priority with respect to each other rule. For example, a hierarchical plurality of rules (e.g., a rulebook) can include the following rules, in increasing order of priority: 1: maintain a predetermined speed limit; 2: stay in lane; 3: maintain a predetermined clearance; 4: reach goal; 5: avoid collisions. In some examples, the priority represents a risk level of a violation of the behavioral rules. The hierarchical plurality of rules may, in some cases, be implemented as a formal framework to specify driving requirements enforced by traffic laws, cultural expectations, safety considerations, driving norms, etc. as well as their relative priorities. In certain cases, the hierarchical plurality of rules may be implemented as a pre-ordered set of rules having violation priorities (e.g., scores) that capture the hierarchy of the rule priorities. Hence, the hierarchical plurality of rules enables AV behavior specification and assessment in conflicting scenarios.

Referring again to FIG. 6, consider the case where a pedestrian 614 enters the lane in which the AV 602 is traveling. The hierarchical plurality of rules may indicate that the highest priority of the AV 602 is to avoid collision with the pedestrian 614 and other vehicle 604 (e.g., satisfy rule avoid collision, highest priority in the exemplary hierarchical plurality of rules) at the cost of violating lower priority rules, such as reducing speed to less than a minimum speed limit (e.g., violation of rule 1: maintain a predetermined speed limit) or deviating from a lane (e.g. violation of rule 2: stay in lane). For example, generation of the hierarchical plurality of rules may be an after-the-fact prioritization of actions the AV should take based on perfect information (e.g., knowing predetermined values or states) associated with the scenario.

In some cases, the AV may determine a trajectory of the AV that causes a violation of a behavioral rule such that the AV exceeds a predetermined speed limit (e.g., 45 mph). For example, the rule (1) may be to maintain a predetermined speed limit, denoting that the AV should not violate the speed limit of the lane it is traveling in. In the aforementioned example, the priority of rule (1) is lower than the priority of rule (5): avoid collisions, rule (4): reach goal, rule (3): maintain clearance, and/or rule (2): stay in lane. Thus, the AV may violate rule (1) to avoid violating rules (2), (3), (4) and/or (5).

In an embodiment, the AV may determine a trajectory of the AV that causes a violation of a behavioral rule such that the AV stops before reaching a destination. In examples, rule (2) may be to stay in lane, denoting that the AV should stay in its own lane. The priority of rule (2) is lower than the priority of rule (5): avoid collisions, rule (4): reach goal, and/or rule (3): maintain clearance. Thus, the AV may violate rule (1) or rule (2) to avoid violating rules (3), (4), and/or (5).

In an embodiment, the AV may determine a trajectory of the AV that causes a violation of a behavioral rule such that a lateral clearance between the AV and the objects near the AV decreases below a threshold lateral distance. For example, rule (3) may be to maintain a predetermined clearance, denoting that the AV should maintain a threshold lateral distance (e.g., one half car length or 1 meter) from any other object (e.g., pedestrian 614). The priority of rule 3 is lower than the priority of rule (5): avoid collisions, and/or rule (4): reach goal, and the AV can violate rules (1), (2), or (3) to avoid violating rules (4) and/or (5).

In some embodiments, the sets of alternative trajectories are generated based on driver and/or driving behavior. For example, the trajectories may include trajectories generated based on driver behavior (e.g., human driver behavior), trajectories generated based on driving behavior (e.g., trajectories generated by a model), training trajectories, or any other trajectories. The trajectories may be grouped into a plurality of trajectory sets, and can be stitched together to generate a graph of trajectories. In some embodiments, the trajectory sets may represent some or all of the trajectories the AV can take with respect to a starting pose (e.g., location, speed, heading, and/or acceleration). Accordingly, the trajectories may include paths that are possible in view of a pose.

Figure 8:
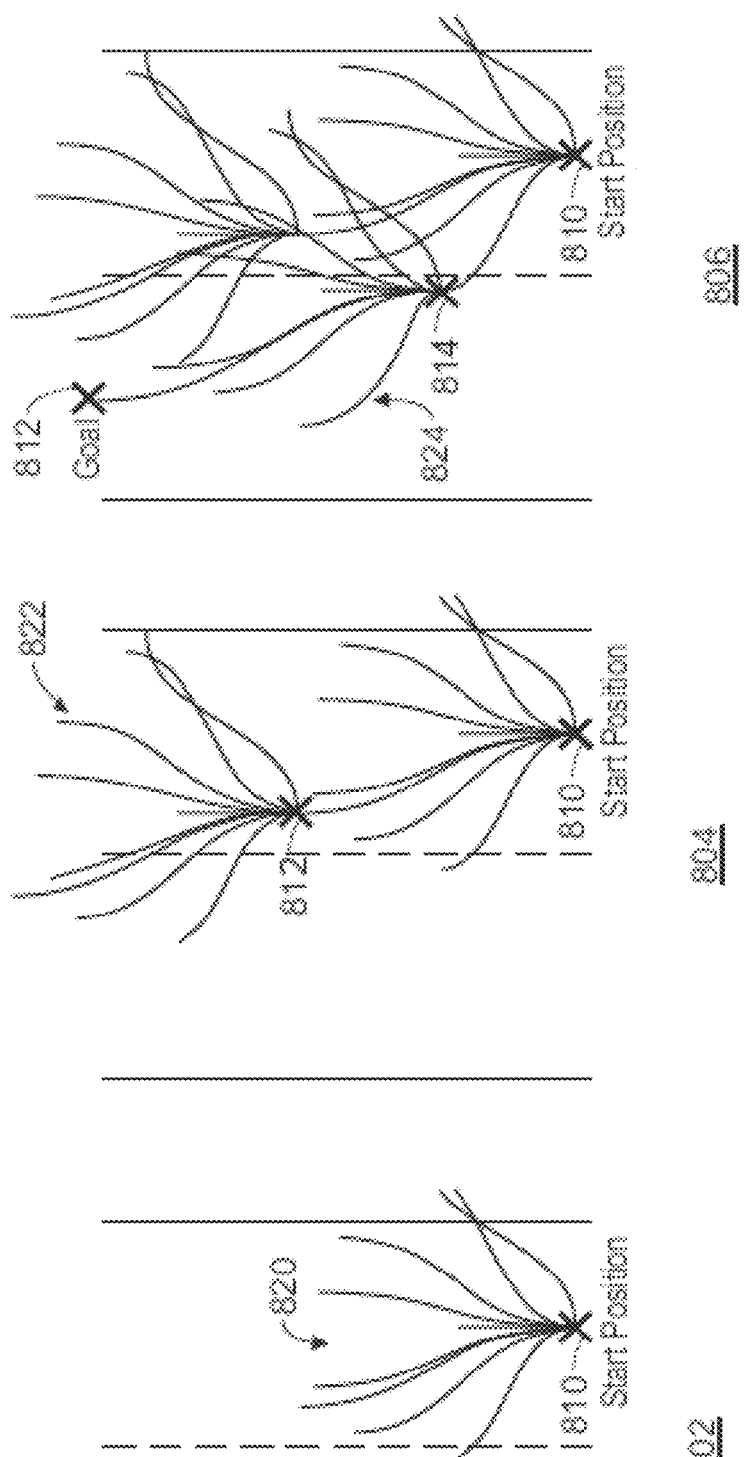
FIG. 8 is an illustration of iteratively growing graphs to find a trajectory after-the-fact.

FIG. 8 is an illustration of iteratively growing graphs 800 to determine a trajectory that violates a rule with a lowest priority (and/or violates no rules) as compared to rules violated by other trajectories after-the-fact. In some embodiments, the generated graphs 802, 804, and 806 are explored to determine a trajectory that represents a preferred path for the vehicle to take through an environment. The preferred path can be used to compare a trajectory taken by the AV in a same scenario associated with the determined trajectories according to the present techniques. The graph generation enables evaluation of an AV response in view of a determined trajectory.

In some embodiments, a preferred trajectory changes over time or based on different locations. Put another way, a preferred trajectory at a first pose might cause a violation of higher priority rules at subsequent poses. For example, during travel through an environment, based on a preferred trajectory at a first pose, the AV can get stuck (e.g., unable to plan a path forward) or left to follow a path that creates a particular rule violation.

In some cases, trajectories are generated without positive reinforcement of selected (e.g., traversed or navigated) trajectories as the AV travels. In traditional techniques, generated trajectories can deteriorate over time. The present techniques evaluate candidate trajectories at a series of poses, such that a subset of the trajectories at a series of poses are selected according to the hierarchical plurality of rules. The trajectories are iteratively traversed to generate a graph of trajectories from a starting pose to a goal pose. The present techniques create a graph based on the fixed set of trajectories. In some embodiments, the generated graph captures vehicular dynamics from the fixed trajectory sets using the series of poses.

In the example of FIG. 8, a first pose 810 of the AV is at the start position. From the start position, a set of alternative trajectories 820 for a vehicle at a first pose 810 (e.g., root node of the corresponding graph) are generated, the set of alternative trajectories representing operation of the vehicle from the first pose 810. In the set of alternative trajectories, one or more trajectories are determined (e.g., trajectories that cause a violation of rules from the hierarchical plurality of rules with a priority lower than the priority of rules violated by other trajectories from the set of alternative trajectories 820). The determined trajectories are used to determine next poses, and a next set of alternative trajectories 822 and 824 are generated from the next poses. In particular, a next pose 812 is evaluated to generate a next set of alternative trajectories 822. A next pose 814 is evaluated to generate a next set of alternative trajectories 824. In some embodiments, sets of alternative trajectories are iteratively generated until the goal/destination 812 is reached.

As illustrated in FIG. 8, the graphs 802, 804, and 806 are generated by calculating a set of alternative trajectories 820 at a first pose 810 in a given scenario. From the set of alternative trajectories 820, the one or more trajectories (e.g., a random or pseudo-random subset of the set of alternative trajectories 820) are determined. In some examples, one or more trajectories are selected based on causing a violation of rules of the hierarchical plurality of rules with the lowest (or lower) priority as compared to rule violations of other trajectories of the set of alternative trajectories 820. For example, a preordered list of priorities according to the rule violations can be associated with each trajectory of the graph. An example of this priority is described below with respect to FIG. 9. Generally, the numbers of trajectories selected for each set of trajectories (e.g., each layer of graph growing) enables tuning of the quality of the graph as compared to the speed of computing the graph. A larger number of trajectories can cause exponential increases in computation time, however the quality of the resulting graph also increases.

In some embodiments, the set of alternative trajectories 820 is grown with the next set of alternative trajectories 822, 824. For example, a next pose (e.g., next pose 812, 814) at the end of a selected trajectory of the set of alternative trajectories 820 is used to iteratively generate a next (e.g., random) set of alternative trajectories (e.g., the next set of alternative trajectories 822, 824). The trajectories that are retained from the next set of alternative trajectories can be trajectories that cause a violation of rules from the hierarchical plurality of rules with a priority lower than the priority of rules violated by other trajectories from the next set of alternative trajectories. Graph growth can continue until one or more trajectories are generated that reach the goal 812 or a timeout occurs. The timeout may be a predetermined period of time before graph generation is terminated. In some examples, the timeout can be canceled or overridden to continue graph generation. The trajectories (e.g., the path) selected for the graph can be those trajectories from the first pose to the goal that have a lowest priority according to the hierarchical plurality of rules.

Figure 9:
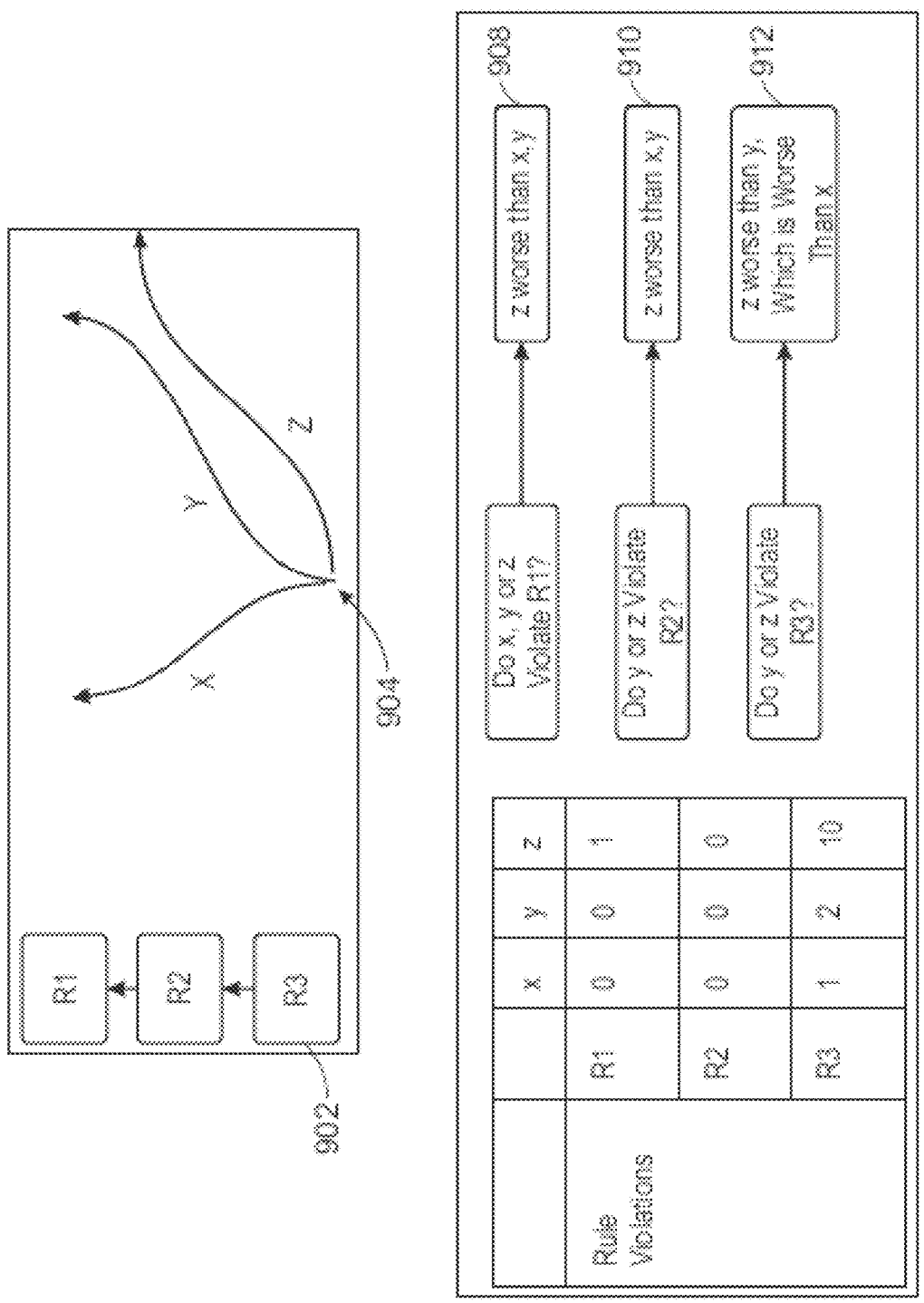
FIG. 9 is a diagram of system that calculates priorities according to a hierarchical plurality of rules.

FIG. 9 is a diagram of system 900 that calculates a priority (e.g., a score) for all or a portion of trajectories according to a hierarchical plurality of rules. A path can include multiple trajectories and the system 900 can calculate a priority of the path based on a highest priority of a trajectory of the path as compared to other trajectories of the path, a cumulative priority of the priorities of all or a portion of the trajectories of the path, etc. In the example of FIG. 9, a hierarchical plurality of rules 902 provides three exemplary hierarchical rules: R1 (highest priority), R2 (next highest priority), R3 (lowest priority). The system 900 can assign all or a portion of the hierarchical rules a base priority based on the hierarchical plurality of rules 902. The system 900 can further determine a priority of a violation of a rule by a trajectory based on the base priority and a level of a violation of the rule. For example, the hierarchical plurality of rules 902 indicates that a violation of rule R1 has a priority of 1 and the system 900 determines that a singular violation of rule R1, a lesser violation of rule R1 (as compared to other violations), etc. has a priority of 1 and multiple violations of rule R1, a greater violation of rule R1 (as compared to other violations), etc. has a priority of 2. Additionally, a fixed set of trajectories 904 includes a trajectory x, trajectory y, and trajectory z. The fixed set of trajectories may be the same as or similar to the trajectories 616 (FIG. 6) or trajectories 820, 822, or 824 of FIG. 8. In some embodiments, the fixed set of trajectories represent all or a portion of the actions that vehicles can make in traffic situations. In some examples, the fixed set of trajectories is generated using a planning system of an AV (e.g., planning system 404 of FIG. 4) in response to simulation in a predetermined scenario. In examples, the predetermined scenario is represented by AV compute inputs and outputs as the AV travels from a starting pose toward a destination.

In some embodiments, the priority represents a comparative level of a rule violation as compared to the level of rule violation by one or more other trajectories. For example, each individual rule is independently evaluated and compared to all or a portion of the other trajectories. The priority can be based on, at least in part, the particular rule. For example, for a rule associated with a minimum clearance between the AV and a pedestrian, the priority is based on the number of violations (e.g., instantaneous violations) of clearance associated with the AV and one or more pedestrians, the distance between the AV and a pedestrian, etc. In this example, the violations are entering a space near the pedestrian by violating a clearance between the AV and the pedestrian. Each trajectory can be ranked based on the number of violations, the type of violations, the magnitude of violations, etc. according to a lexicographic order.

In the example of FIG. 9, system 900 identifies rule violations caused by all or a portion of the fixed set of trajectories to determine rule violation priorities 906 for each trajectory. In particular, the system 900 evaluates all or a portion of the rules to determine the rule violation priorities for a trajectory. At evaluation 908, the system 900 evaluates rule R1 to determine if trajectory x, trajectory y, or trajectory Z violates rule R1. In the example of FIG. 9, the system 900 determines that trajectory z violates rule R1, while trajectory x and trajectory y do not violate rule R1. The system 900 assigns trajectory z a priority of 1 with respect to rule R1. The system 900 assigns trajectories x and y a priority of 0 with respect to rule R1. At evaluation 910, the system 900 evaluates rule R2 to determine if trajectory x, trajectory y, or trajectory Z violates rule R2. In the example of FIG. 9, no trajectory violates rule R2. The system 900 assigns each trajectory a priority 0 with respect to rule R2. At evaluation 908 trajectory z is the only trajectory that violates R1, so the system 900 assigns a priority for violation of rule R1 to trajectory z. At evaluation 902, no trajectory violates rule R2 so the system 900 does not assign a priority for violation of rule R2 to any of the trajectories (or assigns a priority of 0).

At evaluation 912, the system 900 evaluates rule R3 to determine if trajectory x, trajectory y, or trajectory z violates rule R3. In the example of FIG. 9, the system 900 determines trajectory z violates rule R3 worse than trajectory y violates rule R3, which in turn violates rule R3 worse than trajectory x. violates rule R3 The system 900 assigns trajectory z a priority of 10 with respect to rule R3, where 10 is the maximum number of violations of rule R3. The system 900 assigns trajectory x a priority of 1, and trajectory y a priority of 2 with respect to rule R3.

In some examples, from a set of fixed trajectories, the system 900 can determine a random subset of the trajectories. The determined trajectories can be the trajectories that have a priority above a predetermined threshold with respect to all or a portion of the rules. In some examples, the system 900 can select all or a portion of the trajectories that have a priority above the predetermined threshold according to the hierarchical plurality of rules for the graph. In some embodiments, the system 900 generates a second set of trajectories from poses located at the end of the determined trajectories (e.g., the system grows the determined trajectories). Graph growth can continue until one or more paths of trajectories are generated that reach the goal pose. The system 900 can select a path for the graph from the first pose to the goal pose that has a lowest priority (e.g., cumulative or total priority) as compared to other paths that reach the goal pose according to the hierarchical plurality of rules. In this manner, the system 900 can generate the graph as a guided heuristic using the behavior modeling and prediction data set. In some examples, the present techniques do not converge on a singular trajectory or path. For example, the system 900 can obtain multiple trajectories or paths with a particular priority.

Figure 10:
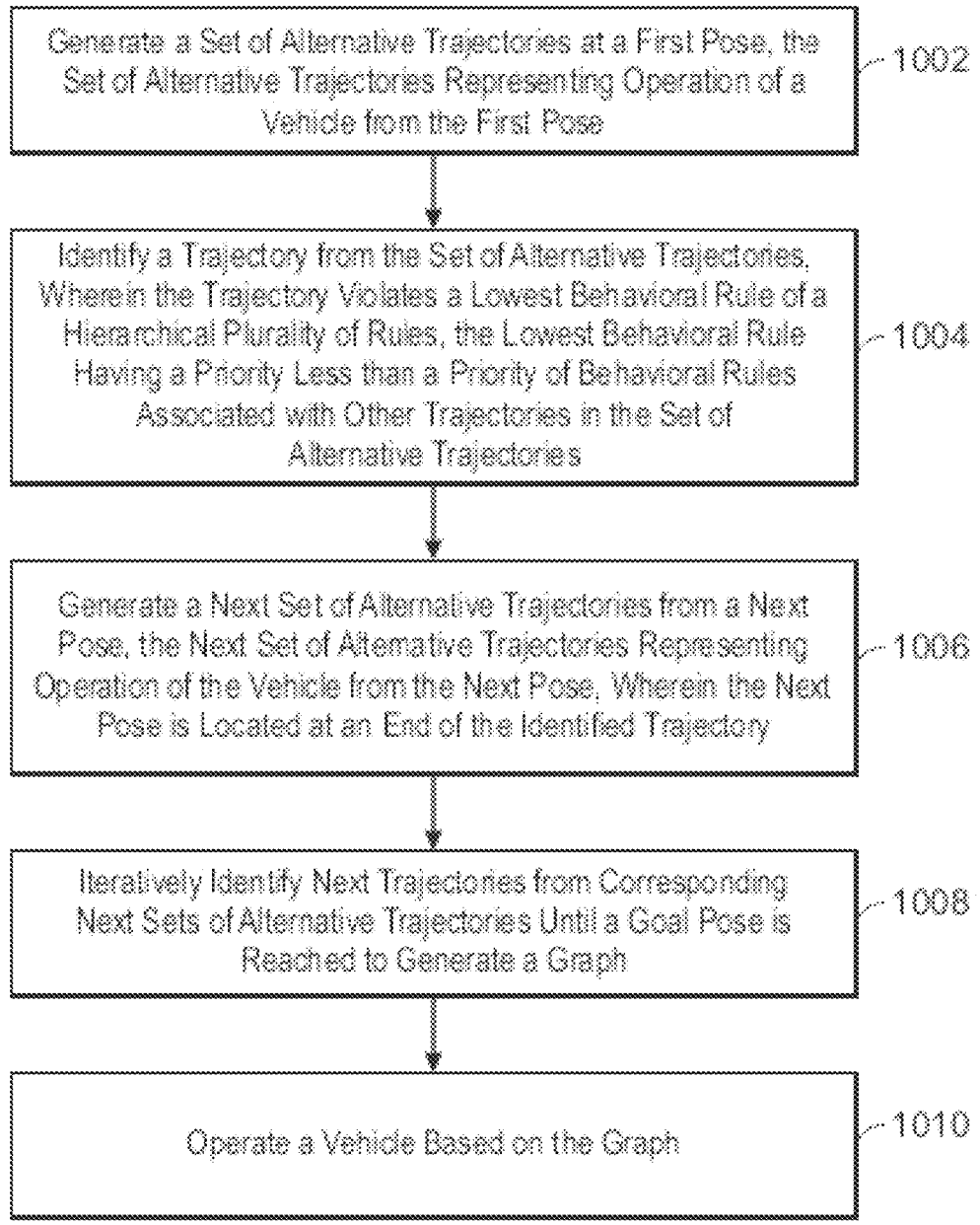
FIG. 10 is a flowchart of a process for graph exploration for trajectory generation.

Referring now to FIG. 10, illustrated is a flowchart of a process 1000 for graph exploration for trajectory generation based on a hierarchical plurality of rules. In some embodiments, one or more of the steps described with respect to process 1000 are performed (e.g., completely, partially, and/or the like) by autonomous vehicle 200 of FIG. 2 or AV computer 400 of FIG. 4. Additionally, or alternatively, in some embodiments one or more steps described with respect to process 1000 are performed (e.g., completely, partially, and/or the like) by another device or group of devices separate from or including autonomous system 400 such as device 300 of FIG. 3.

At block 1002, a set of alternative trajectories for a vehicle at a first pose are generated. In some embodiments, the alterative trajectories are sets of trajectories generated using behavior prediction. In some embodiments, the first pose is a root node of the corresponding graph. The set of alternative trajectories represent operation of the vehicle from the first pose.

At block 1004, a trajectory from the set of alternative trajectories is identified. In some embodiments, the trajectory violates a behavioral rule of a hierarchical plurality of rules with a priority less than a priority of behavioral rules violated by other trajectories in the set of alternative trajectories. Accordingly, in some embodiments, the present techniques select the one or more trajectories at the first node that cause a violation of a lowest priority rule as compared to violations of other rules by other trajectories.

At block 1006, a next set of alternative trajectories is generated from a next pose at the end of the trajectory responsive to identifying the trajectory. The next set of alternative trajectories represents operation of the vehicle from the next pose. In this manner, the graph is iteratively grown based on the next pose at the end of the identified trajectory. The next set of alternative trajectories for the vehicle may be generated from the next pose by applying vehicle dynamics associated with the next pose to possible trajectories associated with a location of the next pose. Vehicle dynamics include, for example, speed, location, acceleration, and orientation associated with the trajectory at the next pose.

At block 1008, next trajectories from corresponding next sets of alternative trajectories are iteratively identified. In some embodiments, a next trajectory violates a behavioral rule of the hierarchical plurality of rules with a priority less than a priority of behavioral rules violated by other trajectories in a corresponding next set of alternative trajectories until a goal pose is reached to generate a graph. Put another way, in some embodiments, the present techniques iteratively repeat steps of identifying a trajectory from a set of trajectories at a pose at the end of a previously identified trajectory until the goal pose is reached. In some embodiments the trajectory does not reach a goal pose, and the present techniques iteratively repeat steps of identifying a trajectory at the end of a previously identified trajectory until a predetermined timeout occurs. In some examples, the trajectory is the trajectory that violates the lowest priority behavioral rules as compared to other trajectories, where the trajectories are ranked according to rule violations in a hierarchical plurality of rules. Growing the graph generally continues until a path to the goal pose from the first pose is identified as described above. At block 1010, a vehicle is operated based on the graph. In examples, vehicle operation based on the graph includes extracting a path (e.g., one or more trajectories) from the graph and comparing a trajectory taken by a vehicle to the trajectories of the extracted path. In this manner, performance of the vehicle is evaluated in view of a determined trajectory. The trajectories of the path extracted from the graph can be used to provide feedback on vehicle performance.

Trajectory Generation from Diverse Trajectories

A system can operate a vehicle to move along a route (e.g., from a first location to a second location). As the vehicle moves along the route, the vehicle may encounter a number of objects (e.g., pedestrians, other vehicles, traffic lights, traffic signs, road work, traffic, etc.). In response, the vehicle can generate one or more trajectories or paths around the objects. However, the generated trajectories or paths may violate one or more rules, such as but not limited to traffic laws, cultural expectations of driving behavior, a destination, etc. As discussed above, the rules can be grouped into a hierarchical plurality of rules that defines a priority of all or a portion of the rules.

As a path may cause a violation of a different rule with a different priority or may not cause a violation of rule, the system can select a path that causes a violation of a rule with the lowest priority or no violation of a rule. The operation of the vehicle according to a path that causes a violation of a higher priority rule when a path that causes a violation of lower priority rule is available can produce adverse effects, such as increasing the likelihood of a collision or causing discomfort to passengers.

To identify a path around one or more objects, the system can select a set of trajectories in different planning steps for the path based on the priority of rules violated by the trajectories of the set of trajectories. For example, in a first planning step, the system can select a first trajectory (T1) based on a priority of a rule (P1) violated by the first trajectory compared to a priority of rules (e.g., P2, P3) violated by other trajectories (e.g., T2, T3) generated during the first planning step. In a second planning step, the system can select a second trajectory branched from the first trajectory (e.g., T1.TA) based on a priority of a rule (P4) violated by the second trajectory compared to a priority of rules (e.g., P5, P6) violated by other trajectories (e.g., T1.TB, T1.TC) generated during the second planning step. Accordingly, the system may not consider trajectories that do not branch from a trajectory selected during a previous planning step. For example, in the second planning step, the system may not consider trajectories that branch from trajectories T2 or T3 in the first planning step). Therefore, systems can generate a path by iteratively selecting trajectories branched from trajectories selected during previous planning steps. The systems can generate a route by combining one or more paths.

The iterative selection of trajectories according to the rules violated by all or a portion of trajectories in a planning step, however, may not define a preferred path (e.g., a path with a lower number of violations or an overall lower priority of violations). For instance, while a trajectory selected during a first planning step may violate a rule with a lowest priority as compared to the priority of other rules violated by trajectories available during the first planning step, trajectories branched from the selected trajectory and selected during subsequent planning steps may violate higher priority rules as compared to the other rules and/or the rule with the lowest priority. For example, all or a portion of the trajectories branched from a trajectory selected during a first planning step (e.g., T1.TA, T1.TB, T1.TB) may violate a rule with a higher priority (P4) than the priority of rules (e.g., P5, P6, P7) violated by a trajectory branched from a different trajectory in the first planning step (e.g., T2.TA, T2.TB, T2.TC).

Further, the difference between the priority of rules violated by all or a portion of the trajectories branched from a trajectory selected during a first planning step and the priority of a rule by a trajectory branched from a trajectory not selected during the first planning step may be greater than the difference between the priority of the rule violated by the trajectory selected during the first planning step and the trajectory not selected during the first planning step. In some cases, the priority of rules violated by all or a portion of the trajectories branched from a trajectory selected during a first planning step exceed the priority of a rule violated by a trajectory not selected during the first planning step and the priority of a rule violated by a trajectory branched from the trajectory not selected during the first planning step. Thus, the aggregate severity of violations by selecting trajectory T1 and one or more of its branches may be greater than the aggregate severity of violations by selecting trajectory T2 and one or more of its branches even though trajectory T2 violates a higher prioritized rule than trajectory T1. Therefore, the selected trajectories for a path may not represent a path that causes a violation of a rule with the lowest priority.

Some systems maintain each potential trajectory at each planning step and select a route based on each potential trajectory at each planning step. Such a maintaining of each potential trajectory at each planning step may be computationally inefficient. For example, the number of potential trajectories may be large (e.g., over 100 trajectories) and as each potential trajectory is maintained at each planning step, the number of trajectories may grow exponentially (e.g., N×N×N etc.) where N is the number of trajectories in a given planning step. Therefore, it may be computationally inefficient and intensive to maintain each potential trajectory for each planning step.

To address these issues, the planning system 404 can, at some or each planning step, generate a set of diverse trajectories. The planning system 404 can branch a set of new (diverse) trajectories from (each of) the set of diverse trajectories. Based on the set of new trajectories branched from the set of diverse trajectories, the system can determine a collection of trajectories or a path for the vehicle. By maintaining a set of diverse trajectories at various planning steps (instead of selecting one trajectory at a particular planning step), the planning system 404 can increase the likelihood that the path determined by the planning system 404 represents an overall path that causes a violation of a rule (or rules) with a lower priority than other potential paths. By limiting which trajectories are maintained at various planning steps instead of maintaining each trajectory at each planning step, the planning system 404 can prioritize particular trajectories. Further, by prioritizing particular trajectories, the planning system 404 can reduce the computational intensity and/or complexity and increase the efficiency of the path determination process. Such a reduction in the computational intensity can reduce the cost associated with the path determination process as compared to some systems that maintain each trajectory at each planning step.

In some cases, the set of diverse trajectories includes trajectories that cause a violation of different rules. For example, the set of diverse trajectories may include trajectories that cause a violation of different rules of the hierarchical plurality of rules. In some cases, each trajectory of the set of diverse trajectories violates a different rule (e.g., the set of diverse trajectories may not include multiple trajectories that cause a violation of the same rule). In some cases, the set of diverse trajectories includes trajectories that are spatio-temporally diverse. For example, the set of diverse trajectories may include trajectories that are each spatio-temporally separated from each other trajectory of the set of diverse trajectories by a particular amount (e.g., five meters) within an environment. The set of diverse trajectories may include trajectories with a particular priority based on the hierarchical plurality of rules. For example, each trajectory of the set of diverse trajectories may violate a rule with a priority value below a threshold value (e.g., a low priority value). In another example, the set of diverse trajectories may include trajectories that cause a violation of different rules of the hierarchical plurality of rules with a priority value above the threshold value.

The planning system 404 can generate and/or identify a first set of diverse trajectories during a particular planning step. The planning system 404 can maintain some or all of the set of diverse trajectories. In a subsequent planning step, the planning system 404 can branch a set of (diverse) trajectories from some or all of the trajectories of the diverse trajectories. For example, the planning system 404 can branch a subsequent trajectory (or multiple trajectories) from a pose at the end of one or each trajectory of the first set of diverse trajectories. As a non-limiting example, if the set of diverse trajectories includes three "parent" trajectories, the planning system 404 can generate three (or more) additional trajectories from the end of each of the three parent trajectories for a total of nine (or more) "child" trajectories (with each parent trajectory having three child trajectories). It will be understood that the planning system 404 can generate fewer or more parent trajectories and/or child trajectories for each parent trajectory. The planning system 404 can identify, from all or a portion of the new "child" trajectories branched from the parent trajectories, new diverse trajectories or "grandchild" trajectories. The planning system 404 can repeat the process by branching new trajectories from all or a portion of new set of diverse trajectories. The planning system 404 can iteratively repeat the process of identifying sets of diverse trajectories and branching new trajectories from the sets of diverse trajectories during a trajectory generation period according to a vehicle planning policy.

The trajectory generation period can correspond to the period of time in which the planning system 404 generates trajectories before taking a particular action, and the vehicle planning policy can take into account any one or any combination of threshold simulated time period, threshold simulated number of trajectories, threshold simulated distance or landmark reached or passed, or threshold time to determine how long to generate new trajectories. For example, the vehicle planning policy can indicate that the planning system is to generate trajectories until six seconds of travel time (or some other threshold time period) has been simulated or determined. As another example, the vehicle planning policy can indicate that the planning system 404 to generate or simulate one hundred trajectories (or some other threshold number of trajectories). In certain cases, the vehicle planning policy can indicate that the planning system 404 is to generate trajectories until a threshold distance has been simulated (or a landmark reached) and the trajectory generation period corresponds to the period of time to generate. For example, the planning system 404 can select trajectories for the vehicle 200 until ¼ mile (or other threshold distance) has been simulated or until an intersection (or another landmark) has been passed. As such, the planning system 404 can stop generating trajectories even though additional trajectories could be simulated (e.g., the simulations could continue). In some cases, the vehicle planning policy can indicate that the planning system 404 is to generate trajectories until a threshold time has been satisfied. For example, the planning policy can indicate that the planning system 404 has 50 ms, 100 ms, or 200 ms (or some other threshold time) to generate trajectories. During that time, the planning system 404 can generate as many trajectories as possible.

According to the vehicle planning policy, using the trajectories generated during the trajectory generation period, the planning system 404 can select a combination of trajectories (e.g., including trajectories during multiple planning steps) from multiple combinations of trajectories. The planning system 404 can select the combination of trajectories by identifying a rule violated by a combination of trajectories with the highest priority. The planning system 404 can compare the priorities of the rules violated by all or a portion of the combinations of trajectories to identify a combinations of trajectories that violates a rule with a lowest priority as compared to other combinations of trajectories. In some cases, the planning system 404 selects the combination of trajectories by identifying a rule violated by a final trajectory of all or a portion of the combinations of trajectories. The planning system 404 can compare the priorities of the rules violated by all or a portion of the final trajectories to identify a combination of trajectories with a final trajectory that violates a rule with a lowest priority as compared to other final trajectories of other combinations of trajectories.

Based on the selected combination of trajectories, the planning system 404 can define a collection of trajectories or a path for a vehicle from a first pose to a second pose. The collection of trajectories or the path can include all or a portion of the trajectories of the selected combination of trajectories. The path can define a portion of a route for the vehicle from a first pose to a second pose (a first trajectory) to a third pose (a second trajectory) to a fourth pose (a third trajectory) . . . to a final pose (a final trajectory). While a given trajectory of the path may cause a violation of a rule with a higher priority than another trajectory of the same planning step, the path may cause a violation of a rule with a lower priority than another path that includes the another trajectory due to the planning system 404 maintaining a set of diverse trajectories at a planning step (e.g., at each planning step). Therefore, the planning system 404 can generate a path based on the rules that a diverse trajectory violates without considering each potential trajectory in a given planning step.

The planning system 404 can define a route from a source to a destination based on the path. For example, the route can be based on multiple paths or trajectories.

The planning system 404 can utilize the path to train and/or test a control system of a vehicle. In some cases, the planning system 404 can provide a scene to a control system of a vehicle (e.g., in real time) and verify whether the vehicle to navigate the scene according to the path.

Figure 11:
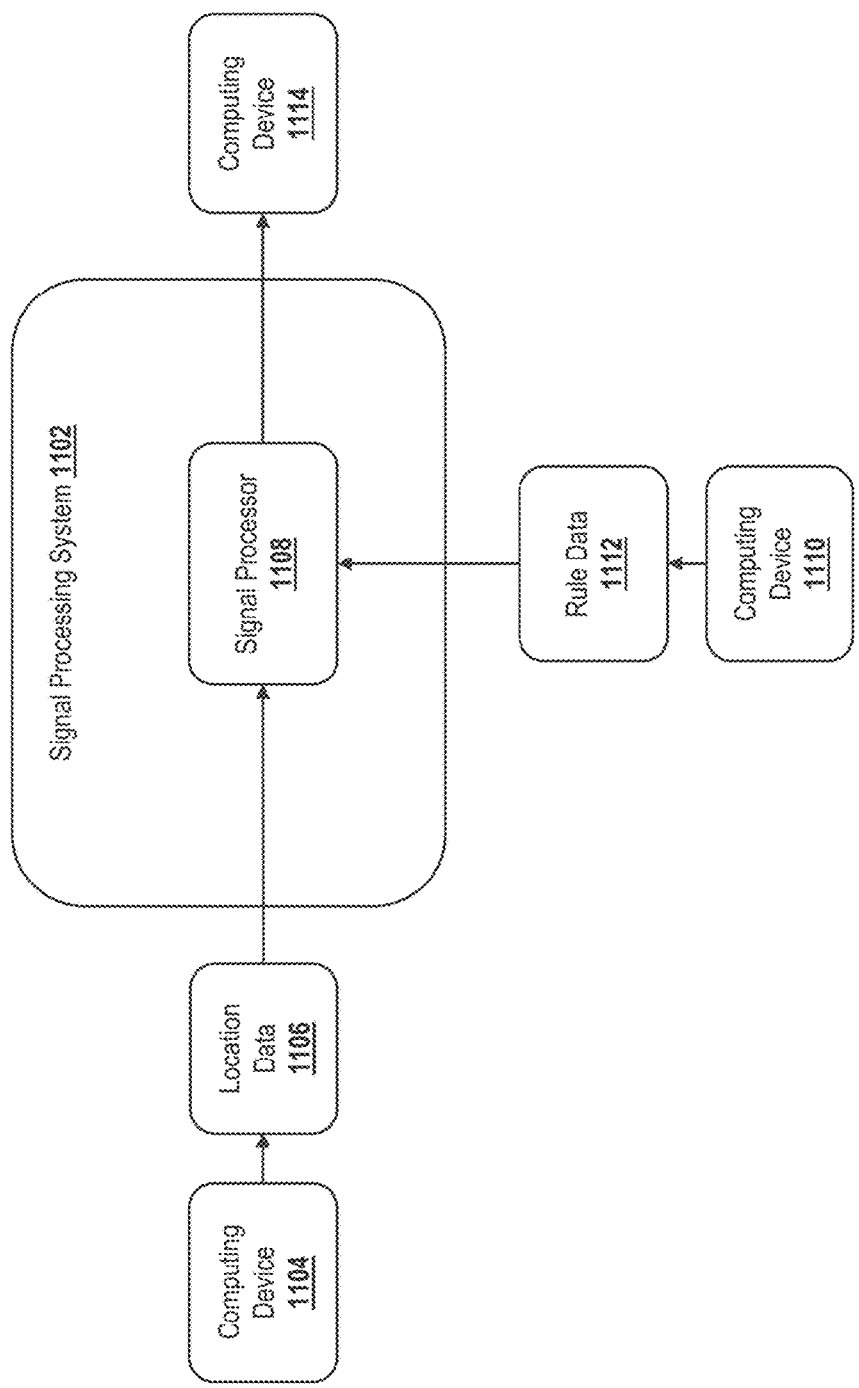
FIG. 11 is a block diagram illustrating an example of a signal processing system.

FIG. 11 is a block diagram illustrating an example of a signal processing environment 1100. In the illustrated example, the signal processing environment 1100 includes a signal processing system 1102 communicatively coupled with a computing device 1104, a computing device 1110, and a computing device 1114. All or a portion of computing device 1104, computing device 1110, and computing device 1114 can be the same as or similar to device 300 as described in FIG. 3. In some cases, the signal processing environment 1100 and/or the signal processing system 1102 can form at least a part of the planning system 404, described herein at least with reference to FIG. 4. The signal processing system 1102 can receive location data 1106 associated with the computing device 1104, and use the location data 1106 to identify a path for a vehicle.

The signal processing system 1102 (or another computing system) can initialize a path generation process. For example, the signal processing system 1102 can receive a request from a computing device (e.g., a user computing device) to navigate to a particular destination. In response, the signal processing system 1102 can initialize a path generation process to generate a path from a first pose to a second pose. In some cases, the signal processing system 1102 can generate a route for the vehicle from a source (e.g., a location of the vehicle) to the destination for the vehicle based on one or more paths. In another example, the signal processing system 1102 can receive a request to train or test a control system of the vehicle and, in response, initialize the path generation process.

The computing device 1104 provides location data 1106 associated with a location of a vehicle to the signal processing system 1102. In some cases, the signal processing system 1102 causes the computing device 1104 to provide the location data 1106 based on the initialization of the path generation process. The computing device 1104 may be a computing device for generating training data (e.g., training location data that represents the location of a vehicle (physical or simulated) having an autonomous system installed thereon) and may provide the training data to the signal processing system 1102 to train and/or test a control system of a vehicle. In some cases, the computing device 1104 may be in communication with a sensor. For example, the computing device 1104 may be in communication with (e.g., receive sensor data from) a location sensor (e.g., a global positioning sensor) associated with (e.g., located in, affixed to, etc.) a vehicle. In some embodiments, the computing device 1104 may be in communication with a plurality of sensors (e.g., a plurality of different location sensors) that each generate and/or provide location data to the signal processing system 1102. Similarly, the location data 1106 can include different types of location data, such as global positioning data associated with a vehicle. In some cases the computing device 1104 generates location data 1106 based on one or more settings (e.g., a time period). For example, the one or more settings may identify a time period for detection of the location data 1106. The location data 1106 may include streaming data and/or batch data.

In the illustrated example, the signal processing system 1102 includes a signal processor 1108 to receive the location data 1106, however, it will be understood that the signal processing system 1102 can include fewer, more, or different components. The signal processor 1108 can process the location data 1106 to generate path data. In some cases, the signal processor 1108 processes the location data 1106 to generate path instructions for a control system of a vehicle.

The signal processor 1108 can also receive rule data 1112 associated with a hierarchical plurality of rules. The signal processor 1108 can receive the rule data 1112 from a computing device 1110 and/or a data store. In some cases, the signal processor 1108 parses the rule data 1112 to identify a subset of the rule data 1112 associated with a particular vehicle. For example, the signal processor 1108 may parse the rule data 1112 to identify a subset of the rule data 1112 associated with a particular region or location where a vehicle is located, a particular vehicle type of the vehicle, a user associated with a vehicle, etc.

The rule data 1112 may include a hierarchical plurality of rules (e.g., a rulebook). For example, the rule data 1112 may identify a plurality of rules that are ordered or ranked based on a priority of each rule. As discussed above, a rule may have a priority with respect to all or a portion of the other rules. For example, the rule data 1112 can identify the following rules, in increasing order of priority: 1: maintain a predetermined speed limit; 2: stay in lane; 3: maintain a predetermined clearance; 4: reach goal; 5: avoid collisions. The priority of the rule may represent a risk level of a violation of the rule. For example, a collision may have a high risk level as compared to exceeding a speed limit. Therefore, the rule data 1112 may include an ordered set of rules (e.g., based on traffic laws, cultural expectations of driving behavior, a destination, a time for reaching the destination, etc.) and a priority of each rule.

Based on the location data 1106 (e.g., a source and a destination for the vehicle), the signal processor 1108 can implement a series of planning steps. During a planning step (e.g., during each planning step), the signal processor 1108 can determine a set of trajectories and identify a set of diverse trajectories within the set of trajectories. During an initial planning step, the signal processor 1108 can determine the set of trajectories by determining a set of potential trajectories from an initial pose (e.g., an initial location of a vehicle). During a subsequent planning step, the signal processor 1108 can determine the set of trajectories by branching a set of trajectories from a pose at an end of a trajectory maintained in the prior planning step. For example, if a first trajectory that ends at a first pose and a second trajectory that ends at a second pose are maintained during a first planning step (e.g., based on the signal processor 1108 identifying that the first trajectory and the second trajectory are diverse), the signal processor 1108 can branch a set of new trajectories from the first pose and the second pose during a second planning step.

To identify a set of diverse trajectories within a set of trajectories, the signal processor 1108 can identify and/or obtain specification data that identifies how a set of diverse trajectories are identified. The specification data may be based on a trajectory diversity policy that indicates how to identify a set of diverse trajectories (e.g., a level of diversity for trajectories to be considered diverse). For example, the trajectory diversity policy may indicate that a diverse trajectory should be diverse with respect to (e.g., matching or exceeding) a threshold number of the set of diverse trajectories (e.g., 75% of the set of diverse trajectories). In some cases, the trajectory diversity policy may indicate that diverse trajectories are diverse with respect to some or all of the qualities of the trajectory (e.g., the rules violated by the trajectory, the priority of the rules violated by the trajectory, etc.) As discussed below, the signal processor 1108 can compare all or a portion of the set of trajectories using the specification data.

The signal processor 1108 can identify the set of diverse trajectories using the rule data 1112. The signal processor 1108 can identify a rule, from the rule data 1112, that a trajectory may cause a vehicle to violate. The signal processor 1108 can identify trajectories as diverse trajectories if the trajectories cause a violation of different rules. In some cases, the signal processor 1108 can identify trajectories as diverse trajectories if the trajectories cause a violation of rules within different groups of rules. For example, the groups of rules may include speed-related rules, collision-related rules, lane-related rules, destination-related rules, etc. Therefore, the signal processor 1108 can identify a set of diverse trajectories that violate different rules (or different groups of rules) and not including trajectories that violate the same rule (or the same group of rules).

The signal processor 1108 can identify trajectories as diverse trajectories that are spatio-temporally, spatially, and/or temporally diverse. The signal processor 1108 can identify a spatial and/or a temporal component of all or a portion of the trajectories. The signal processor 1108 can compare the spatial and/or temporal component of all or a portion of the trajectories to identify a distance (spatial or temporal distance) or similarity between the spatial and/or temporal components of all or a portion of the trajectories. The signal processor 1108 can compare the distance or similarity to a threshold value. For example, the threshold value may indicate a threshold distance (e.g., five meters, ten meters, five seconds, ten seconds, etc.) or a threshold level of similarity (e.g., 75% dissimilar, 50% dissimilar, etc.). If the signal processor 1108 determines that the distance and/or similarity between the spatial and/or temporal components of two trajectories exceeds and/or matches the threshold value, the signal processor 1108 can determine that the two trajectories are diverse trajectories.

The signal processor 1108 can identify trajectories as diverse trajectories, using the rule data 1112, that violate particular rules represented by the rule data 1112. As discussed above, for all or a portion of the trajectories, the signal processor 1108 can identify a priority of a rule that the trajectory causes a vehicle to violate. The signal processor 1108 can compare the priority to a threshold value. For example, the threshold value may identify a particular priority (e.g., a priority of "High," a priority of 7 on a scale of 1 to 10 where 10 indicates a high priority, etc.). If the signal processor 1108 determines that the priority of a given rule matches and/or is below the threshold value, the signal processor 1108 can determine that the corresponding trajectory that causes a violation of the given rule is a diverse trajectory.

In some cases, the signal processor 1108 identifies the set of diverse trajectories such that each trajectory of the set of diverse trajectories is diverse from each other trajectory of the set of diverse trajectories. The signal processor 1108 can remove a trajectory from the set of diverse trajectories if the trajectory is not diverse from another trajectory of the set of diverse trajectories. In other cases, the signal processor 1108 identifies the set of diverse trajectories such that the set of diverse trajectories includes less than or match a threshold number of trajectories (e.g., 1, 2, etc.) that violate the same rule or the same group of rule. For example, the trajectory diversity policy may indicate that the set of diverse trajectories may include a threshold number of trajectories that violate a rule, a group of rules, etc.

In some cases, if the signal processor 1108 determines that a particular trajectory is not diverse as compared to another trajectory of the set of diverse trajectories, the signal processor 1108 compares the number of trajectories that the non-diverse trajectories not diverse from in the set of diverse trajectories and remove the trajectory that is not diverse from a higher quantity of the set of diverse trajectories from the set of diverse trajectories. For example, the signal processor 1108 may determine that a first trajectory is not diverse from a second trajectory and, based on the first trajectory not being diverse from three other trajectories of the set of diverse trajectories and the second trajectory not being diverse from two other trajectories of the set of diverse trajectories, may remove the first trajectory from the set of diverse trajectories.

As discussed above, based on identifying the set of diverse trajectories during a planning step, the signal processor 1108 can maintain the set of diverse trajectories for a subsequent planning step. The signal processor 1108 can branch a set of new trajectories from some or all of the set of diverse trajectories in the subsequent planning step. The signal processor 1108 can iteratively repeat the process of identifying a set of diverse trajectories and branching a set of new trajectories from some or all of the set of diverse trajectories.

The signal processor 1108 can determine that a goal pose is reached by a particular trajectory (e.g., a destination identified by the location data 1106) or a timeout period has expired. Based on determining that a goal pose is reached and/or the timeout period is expired, the signal processor 1108 can determine that the current planning step is a final planning step. During the final planning step, the signal processor 1108 can identify a plurality of combinations of trajectories (e.g., a plurality of potential paths).

All or a portion of the combinations of trajectories may include different trajectories and may include a trajectory for all or a portion of the planning steps. For all or a portion of the combinations of trajectories, the signal processor 1108 can identify a priority of a rule that the combination of trajectories causes a vehicle to violate. For example, the signal processor 1108 can identify multiple rules that the combination of trajectories causes a vehicle to violate and can identify a rule with the highest priority compared to other rules that the combination of trajectories causes a vehicle to violate. In another example, the signal processor 1108 can identify a rule that a final trajectory of the set of trajectories causes a vehicle to violate. The signal processor 1108 can compare a priority for all or a portion of the combination of trajectories to identify a combination of trajectories associated with a lowest priority as compared to the other combinations of trajectories. Based on identifying the combination of trajectories associated with the lowest priority comparatively, the signal processor 1108 can generate path data identifying a path or route for a vehicle that includes the combination of trajectories.

Based on generating the path data, the signal processor 1108 can determine that the path data should be routed to a computing device 1114. For example, the signal processor 1108 can determine that a control system of a vehicle should be tested or trained using the path data. In another example, the signal processor 1108 can determine that a control system of a vehicle (e.g., computing device 1114) should be instructed to cause navigation of the vehicle according to the path data. Accordingly, the signal processor 1108 can provide the path data to the computing device 1114.

Example Trajectories of a Vehicle

Figure 12:
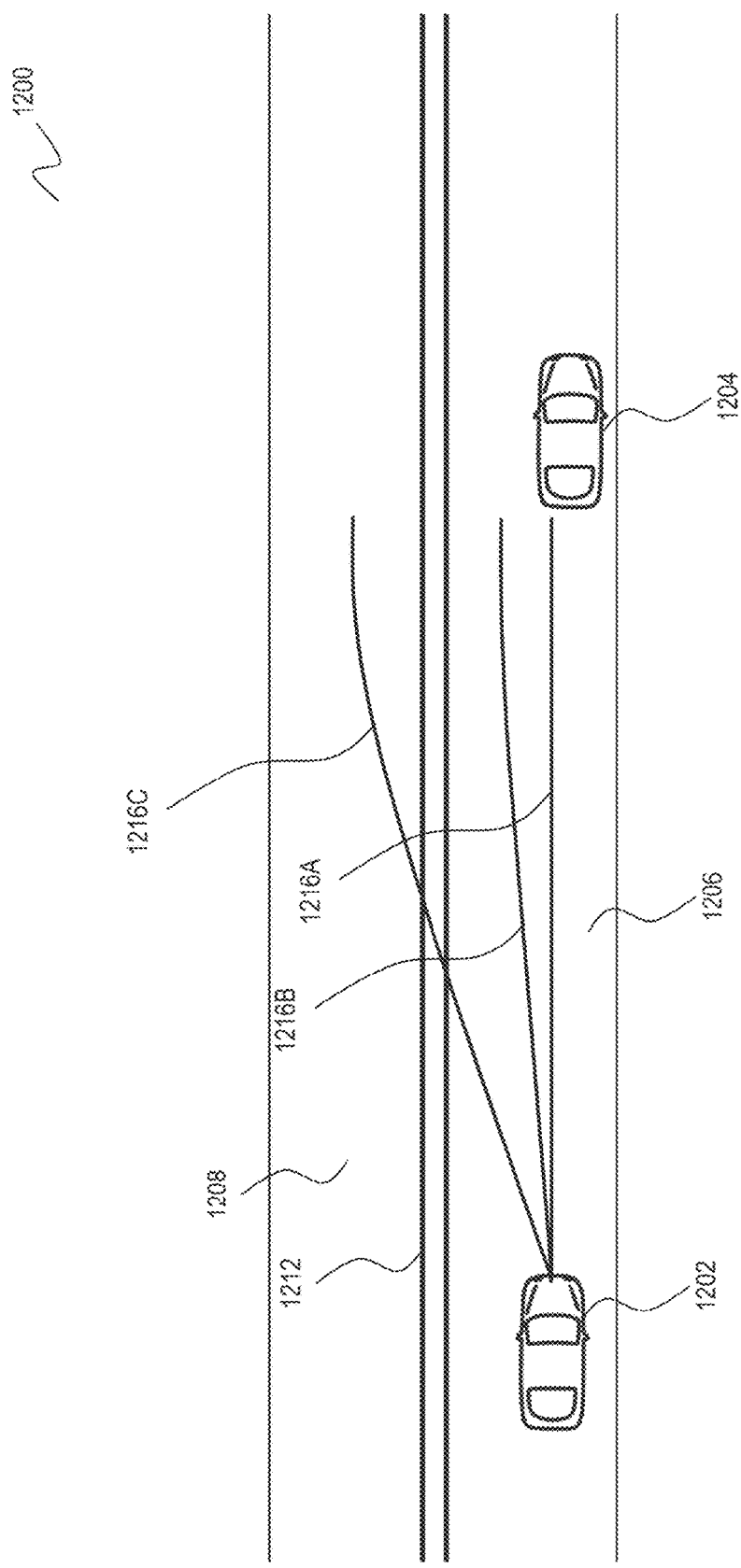
FIG. 12 is an example environment in which a vehicle including one or more components of an autonomous system can be implemented.

FIG. 12 is an example environment 1200 illustrating an example of a vehicle 1202 (e.g., a vehicle that is the same as, or similar to, vehicles 102 and/or vehicle 200) that is associated with an initial pose. The initial pose may identify an initial location, a starting location, etc. of the vehicle 1202. Based on the initial pose of the vehicle 1202 and a destination of the vehicle 1202, a system (e.g., the signal processing system 1102 of FIG. 11) can identify a plurality of trajectories for moving to a second pose from the initial pose. All or a portion of the plurality of trajectories may identify a different trajectory from the initial pose to a different second pose.

The plurality of trajectories may result in a significantly different experience for the vehicle and a user of the vehicle (e.g., a different rule violation, a different speed, etc.). For example, a first trajectory may cause the vehicle to speed up and a second trajectory may cause the vehicle to slow down. In another example, a first trajectory may cause the vehicle to violate a rule with a first priority (e.g., do not maneuver into a different lane) and a second trajectory may cause the vehicle to violate a rule with a second priority (e.g., do not exceed the speed limit) that is lower compared to the first priority.

As described herein, the signal processing system 1102 can determine a path for the vehicle using the plurality of trajectories. The signal processing system 1102 can identify the plurality of trajectories during a particular planning step. The signal processing system 1102 can identify a set of diverse trajectories of the plurality of trajectories. During a subsequent planning step, the signal processing system 1102 can identify a new set of trajectories by branching new trajectories from a pose at the end of all or a portion of the set of diverse trajectories.

By maintaining a set of diverse trajectories at a planning step, the signal processing system 1102 can increase the likelihood that the determined path violates a rule with a lower priority when compared to other potential paths of the vehicle. Further, by maintaining a set of diverse trajectories and not maintaining non-diverse trajectories at a planning step, the signal processing system 1102 decreases the computational requirements and increases the efficiency of the path determination process. The signal processing system 1102 can, therefore, improve the accuracy, reliability, and efficiency of the vehicle 1202 and the path determination process.

In the illustrated example of FIG. 12, the environment 1200 includes the vehicle 1202. The environment 1200 may be similar to the environment 100 as described above with reference to FIG. 1 and/or environment 600 as described above with reference to FIG. 6. The environment 1200 further includes a second vehicle 1204. It will be understood that the example environment 1200 may include more, less, or different features, elements, characteristics, actors, etc. For example, the example environment 1200 may include additional vehicles, bicycles, pedestrians, etc.

The example environment 1200 may include one or more geographical features. In the example of FIG. 12, the example environment 1200 includes a road that is divided into multiple lanes (lane 1206 and lane 1208). The lanes may be divided by a double line 1212. The example environment 1200 may include more, less, or different geographical features and/or artificial features. For example, the example environment 1200 may include a plurality of light sources, a plurality of trees, a median, an off ramp, etc.

In the example of FIG. 12, the vehicle 1202 is operating in lane 1206. The vehicle 1202 is positioned at an initial pose in the lane 1206. Similarly, a second vehicle 1204 is positioned in the lane 1206. The second vehicle 1204 is stopped at a location within the lane 1206. For example, the second vehicle 1204 may be stopped at a location within the lane 1206 due to a mechanical issue, the second vehicle 1204 picking up or dropping off a passenger, etc. The flow of traffic in lane 1206 is opposite to the flow of traffic in lane 1208.

The example environment 1200 may be associated with a hierarchical plurality of rules. For example, the hierarchical plurality of rules may include rules for vehicles navigating within the example environment 1200. In the example of FIG. 12, the traffic rules in the environment 1200 prohibit a vehicle from crossing the double line 612, exceeding a predetermined speed limit (e.g., 45 miles per hour), approaching a stopped vehicle within a particular distance (e.g., within 5 meters), etc. in accordance with generally understood rules of the road.

In some cases, the vehicle 1202 may be navigating to a destination not described in FIG. 12. For example, the vehicle 1202 may be navigating to a particular destination on a different road.

The example environment 1200 may include more, less, or different objects. For example, the example environment 1200 may include more, less, or different objects that can block a trajectory of the vehicle 1202. Pedestrians, construction, cyclists, etc. may block a trajectory of the vehicle 1202. The vehicle 1202 may utilize a signal processing system (e.g., signal processing system 1102 as described in FIG. 11) to identify the objects and determine how to navigate the example environment 1200.

To determine how to navigate the example environment 1200, the signal processing system can receive location data associated with the vehicle 1202. The location data may identify a source or an initial pose of the vehicle 1202 and a destination or a second pose of the vehicle 1202.

Based on the location data, the signal processing system can implement a series of planning steps. All or a portion of the series of planning steps may include identifying a set of trajectories for implementation in the planning step and identifying at least a portion of the set of trajectories that are diverse. For example, the signal processing system can identify a set of potential trajectories for the vehicle 1202 and a set of diverse trajectories of the set of potential trajectories that cause a violation of different rules of the hierarchical plurality of rules, that are spatio-temporally, spatially, or temporally diverse, that cause a violation of particular rules of the hierarchical plurality of rules, etc.

In the example of FIG. 12, the signal processing system identifies a plurality of potential trajectories for the vehicle 1202. The plurality of potential trajectories for the vehicle 1202 may include driving into lane 1208 due to the second vehicle that is stopped in lane 1206, colliding with the second vehicle 1204, maneuvering away from the second vehicle 1204 but staying within the lane 1206, driving on a side of the road beside lane 1206, stopping, etc. A trajectory may be associated with a plurality of similar trajectories. For example, the plurality of potential trajectories may include multiple potential trajectories that involve driving into lane 1208. The multiple potential trajectories may include a different degree to which the vehicle 1202 enters the lane 1208, a different speed when driving in the lane 1208, a different time period for driving in the lane 1208, etc. Therefore, the plurality of potential trajectories may include multiple trajectories that are similar (e.g., multiple trajectories may exceed a threshold value (e.g., 75%) of similarity when compared).

Based on the identified plurality of potential trajectories, the signal processing system identifies a set of diverse trajectories. The set of diverse trajectories include a first trajectory 1216A, a second trajectory 1216B, and a third trajectory 1216C. The signal processing system can identify the set of diverse trajectories based on specification data. The specification data may include instructions for how to identify set of diverse trajectories. For example, the specification data may identify that the set of diverse trajectories are spatio-temporally diverse trajectories, rulebook diverse trajectories, etc. Further, the specification data may identify a threshold value to consider trajectories as diverse. For example, the specification data may indicate that trajectories that violate different rules are diverse, trajectories that violate particular rules are diverse, trajectories that are separated (temporally and/or spatially) by a particular distance are diverse, etc.

In the example of FIG. 12, the signal processing system identifies the first trajectory 1216A, the second trajectory 1216B, and the third trajectory 1216C are diverse trajectories based on determining that the trajectories cause a violation of a different rule. The signal processing system identifies that the first trajectory 1216A causes a violation of a first rule that prohibits collisions with another vehicle, the second trajectory 1216B causes a violation of a second rule that prohibits a vehicle from approaching a particular distance of another vehicle, and the third trajectory 1216C causes a violation of a third rule that prohibits a vehicle from entering a lane of traffic that is flowing in a direction that is oriented differently from a direction of the trajectory.

Based on determining that the first trajectory 1216A, the second trajectory 1216B, and the third trajectory 1216C are diverse trajectories, the signal processing system can maintain the first trajectory 1216A, the second trajectory 1216B, and the third trajectory 1216C for use in a subsequent planning step. For example, the signal processing system can maintain the set of diverse trajectories by storing an identifier of the set of diverse trajectories in a data store. In a subsequent planning step, the signal processing system can identify a set of potential trajectories that branch from all or a portion of the set of diverse trajectories. The set of potential trajectories can branch from a pose at the end of a diverse trajectory of the set of diverse trajectories. The signal processing system can repeat the above process for one or more planning steps until a trajectory reaches a destination or a timeout period is reached.

Based on a trajectory reaching a destination or a timeout period being reached, the signal processing system can identify multiple combinations of trajectories that include a trajectory for all or a portion of the planning steps and correspond to a potential trajectory of a final planning step. The signal processing system can generate a path for the vehicle 1202 by selecting a particular combination of trajectories from the multiple combinations of trajectories based on the rules that the multiple combinations of trajectories causes a vehicle to violate.

Example Operating Diagrams of a Signal Processor

Figure 13A:
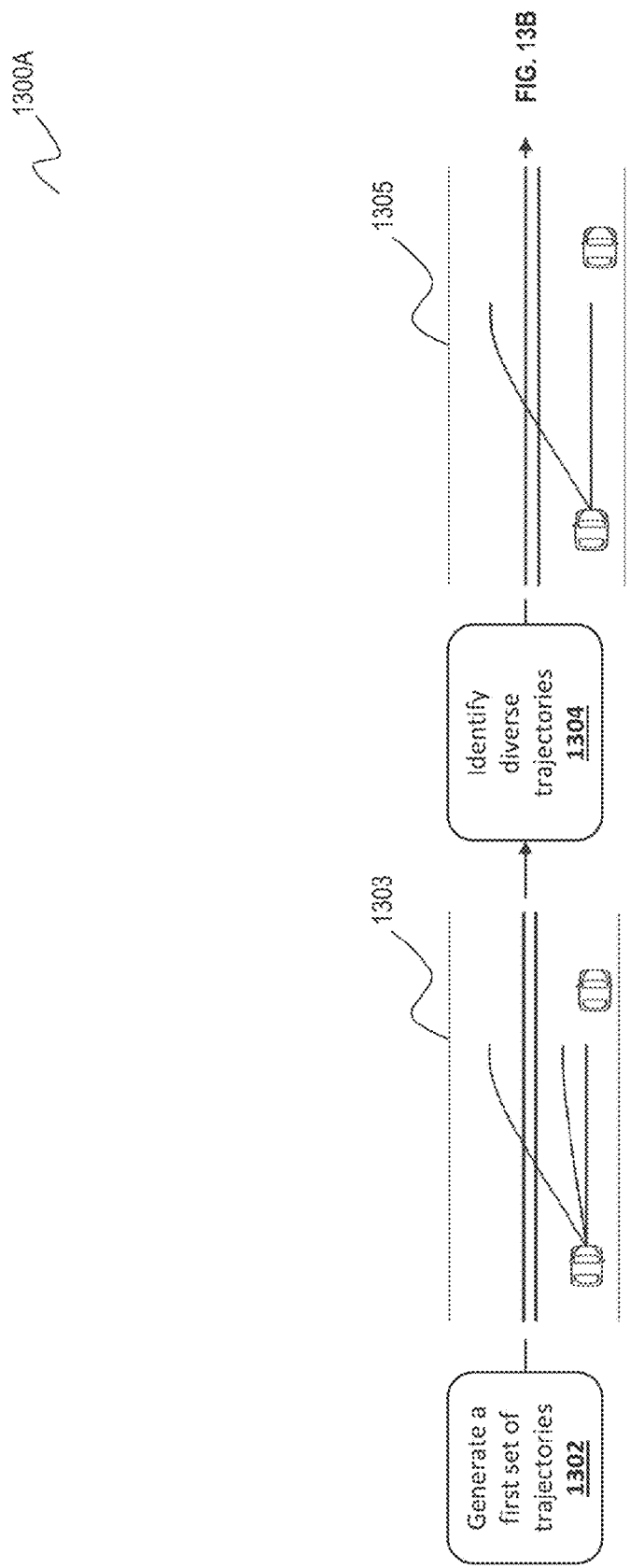
FIG. 13A is a flow diagram illustrating an example identification of a set of diverse trajectories.

FIGS. 13A and 13B are operation diagrams illustrating a data flow for identifying a path for a vehicle based on maintaining a set of diverse trajectories during a planning step. Specifically, FIGS. 13A and 13B are operation diagrams illustrating a data flow for identifying a set of potential trajectories for a vehicle during a planning step, identifying a set of diverse trajectories from the set of potential trajectories, and maintaining the set of diverse trajectories for use in a subsequent planning step. Any component of the planning system 404 can facilitate the data flow for identifying a path for the vehicle based on the maintained set of diverse trajectories. In some embodiments, a different component can facilitate the data flow. In the example of FIG. 13A and FIG. 13B, a signal processing system facilitates the data flow.

At step 1302, the signal processing system generates a first set of trajectories 1303. The signal processing system generates the first set of trajectories 1303 from an initial pose of the vehicle. In the illustrated example, the first set of trajectories 1303 are illustrated within an example environment, however, it will be understood that the first set of trajectories may be defined in a different manner. For example, the first set of trajectories may be defined as a series of intermediate poses between a first pose and a second pose. The signal processing system can identify the first set of trajectories during any planning step of a path generation process that may include a plurality of planning steps. During a planning step, the signal processing system can identify a set of trajectories. During an initial planning step, the signal processing system can identify a set of trajectories from an initial pose of the vehicle. During subsequent planning steps, the signal processing system can identify a set of trajectories from a pose at the end of a trajectory of a set of diverse trajectories identified in a prior planning step.

At step 1304, the signal processing system identifies a set of diverse trajectories 1305 from the first set of trajectories 1303. The signal processing system can identify the set of diverse trajectories 1305 by comparing all or a portion of the set of trajectories 1303 to determine whether a particular trajectory of the set of trajectories 1303 is diverse from all or a portion of the trajectories of the set of trajectories 1303. Therefore, all or a portion of the trajectories of the set of diverse trajectories 1305 may be diverse from all or a portion of the trajectories of the set of diverse trajectories 1305. In some cases, the signal processing system identifies the set of diverse trajectories by identifying different sets of trajectories that include trajectories that are diverse from all or a portion of the trajectories of the set of trajectories. The signal processing system can identify the set of diverse trajectories by identifying the set of trajectories that includes a highest number of diverse trajectories.

The signal processing system can identify the set of diverse trajectories 1305 by comparing the set of trajectories 1303 based on specification data (e.g., a diversity definition) associated with the set of trajectories 1303. The specification data may indicate a quantification of diversity. The quantification of diversity may include a field for measuring diversity (e.g., a spatial component of the trajectory, a temporal component of the trajectory, a rule violated by the trajectory, a grouping of a rule violated by the trajectory, a priority of a rule violated by the trajectory, etc.). Further, the quantification of diversity may include a threshold value for determining whether trajectories are diverse (e.g., a particular temporal distance, a spatial distance, a particular set of rules, etc.).

In one example, the specification data indicates that trajectories are diverse if the trajectories are separated by a particular distance with respect to time or space (e.g., diverse trajectories should be separated by five meters at one or more locations (e.g., each location) along the trajectories, diverse trajectories should be separated by at least five seconds of reaching a pose, etc.) Further, the specification data may indicate that trajectories are diverse if the trajectories violate different rules or groups of rules (e.g., the trajectories violate rules with different priorities, different groupings, etc.). The specification data may indicate that trajectories are diverse if the trajectories violate particular rules (e.g., the trajectories violate rules with a priority that is below a particular priority value (e.g., 5 on a scale of 1 to 10)).

Based on identifying the set of diverse trajectories 1305, the signal processing system can maintain the set of diverse trajectories 1305. The signal processing system can maintain the set of diverse trajectories 1305 for use in a subsequent planning step.

FIG. 13B is an operation diagram 1300B for implementing a subsequent planning step using the maintained set of diverse trajectories 1305 and identifying a path for a vehicle. The operation diagram 1300A may correspond to a first planning step and the operation diagram 1300B may correspond to a second, subsequent planning step. In some examples, the first planning step and the second planning step are separated by one or more intermediate planning steps.

At step 1306, the signal processing system generates a second set of trajectories 1307 for all or a portion of the diverse trajectories. The signal processing system can identify trajectories maintained in a prior planning step. For example, the signal processing system can identify each trajectory maintained and identified as a diverse trajectory in a prior planning step. In some cases, the signal processing system can identify the trajectories maintained during the prior planning step in a data store or cache.

As discussed above, the set of diverse trajectories may indicate one or more trajectories from an initial pose (e.g., the same initial pose) to an end pose (e.g., one or more different end poses). For the set of diverse trajectories, the signal processing system can identify a new second set of trajectories that start at the end pose of a trajectory of the set of diverse trajectories and proceed to a second end pose. The signal processing system can identify a set of trajectories that branch from one of the set of diverse trajectories. For example, the signal processing system can identify ten trajectories that branch from a first trajectory of the set of diverse trajectories 1305, seven trajectories that branch from a second trajectory of the set of diverse trajectories 1305, eight trajectories that branch from a third trajectory of the set of diverse trajectories, etc. In the example of FIG. 13B, the signal processing system identifies one trajectory that branches from a first trajectory of the set of diverse trajectories and two trajectories that branch from a second trajectory of the set of diverse trajectories. It will be understood that the signal processing system can identify more, less, or different trajectories that branch from a trajectory of the set of diverse trajectories 1303. Therefore, the signal processing system can identify a second set of trajectories 1307 for all or a portion of the set of diverse trajectories 1303.

At step 1308, the signal processing system identifies a trajectory 1309 from the second sets of trajectories that violates a rule with the lowest priority. The signal processing system can identify rule data that identifies a plurality of hierarchical rules and a priority of all or a portion of the rules. Using the rule data, the signal processing system can identify, for all or a portion of the trajectories of the second sets of trajectories, a rule that the trajectory causes a vehicle to violate. The signal processing system can compare the priority of the rules violated by the trajectories. Based on comparing the priority of the rules violated by the trajectories, the signal processing system can identify a trajectory that causes a rule to be violated by the vehicle with a lowest priority compared to other rules that other trajectories of the second sets of trajectories cause to be violated.

At step 1310, the signal processing system identifies a path based on the identified trajectory. The signal processing system can dynamically build a path that includes the identified trajectory.

In some cases, to identify the trajectory and the path, the signal processing system can identify, for all or a portion of the second sets of trajectories, a combination of trajectories (e.g., a sequence of trajectories). The combination of trajectories may include trajectories from an initial pose to a final pose. The signal processing system may identify, for all or a portion of the combinations of trajectories, rules that the combination of trajectories causes a vehicle to violate. The signal processing system can identify a rule of the rules that the combination of trajectories causes a vehicle to violate that has the highest priority as compared to the priority of other rules that the combination of trajectories causes a vehicle to violate. Further, the signal processing system can compare the rule that has the highest priority for all or a portion of the combinations of trajectories. Based on comparing the rules, the signal processing system can identify a combination of trajectories with a highest priority rule violation that is lower than the other highest priority rule violations for other combinations of trajectories. Therefore, the signal processing system can identify the path from the combination of trajectories.

The signal processing system can generate path data that identifies the path. Further, the signal processing system can route the path data to a computing device or a data store. In some cases, the signal processing system can route the path data to a control system of a vehicle for operation of the vehicle, and/or to a computing device for training and/or testing.

As described herein, the path generation process can be repeated thousands, hundreds of thousands, millions, or more times in order to generate paths for a vehicle (a path may include one or more trajectories). The signal processing system can combine one or more paths to form a trajectory for a vehicle. By maintaining a set of diverse trajectories from a first planning step, the signal processing system can increase the likelihood that a path violates a rule with a lower priority as compared to other rules violated by other paths. These additional features can enable the signal processing system to accurately and efficiently identify paths for a vehicle.

In addition, during the path generation process, some of the functions or elements described herein may not be used or may not be present. For example, during the path generation process, the signal processing system may not generate the first set of trajectories.

Example Flow Diagram of a Signal Processor

Figure 14:
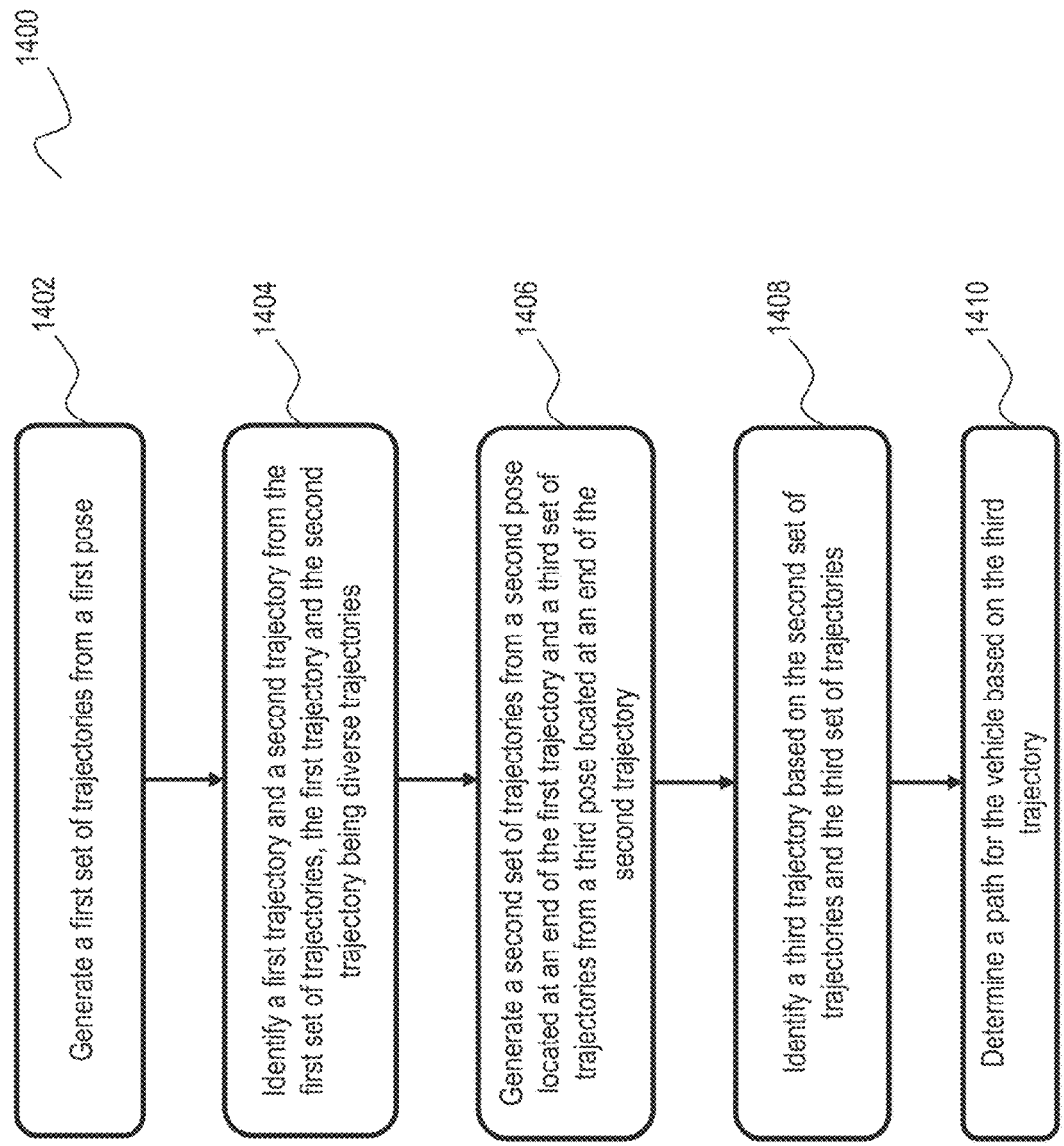
FIG. 14 is a flow diagram illustrating an example of a routine implemented by one or more processors to determine a path for a vehicle based on an identified trajectory.

FIG. 14 is a flow diagram illustrating an example of a routine 1400 implemented by one or more processors (e.g., one or more processors of the signal processing system 1102). The flow diagram illustrated in FIG. 14 is provided for illustrative purposes only. It will be understood that one or more of the steps of the routine illustrated in FIG. 14 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1402, the signal processing system 1102 generates a first set of trajectories from a first pose. The first pose may be an initial pose of a path for a vehicle. In some cases, the first pose is a pose located at an end of a trajectory maintained during a prior planning step (e.g., a diverse trajectory maintained during a prior planning step). The first set of trajectories can represent operation of the vehicle from the first pose.

The signal processing system 1102 can receive rule data identifying a hierarchical plurality of rules. All or a portion of the hierarchical plurality of rules may have a priority with respect to all or a portion of the other rules of the hierarchical plurality of rules. For example, a rule may identify that the vehicle is to maintain a distance from a parked vehicle, the vehicle is to reach a destination, the vehicle is to stay in a lane, etc.

The first set of trajectories can include a static set of trajectories, a dynamic set of trajectories, a sampled set of trajectories, or a set of trajectories based on a control method. For example, the signal processing system 1102 may periodically or continuously update the first set of trajectories.

In some cases, the signal processing system assigns a weight to all or a portion of the first set of trajectories. For example, the signal processing system may assign a rule violation values to each trajectory. The weight may identify a risk associated with a particular trajectory and the given rule violation values.

At block 1404, the signal processing system 1102 identifies a first trajectory and a second trajectory from the first set of trajectories. The signal processing system 1102 identifies and/or determines that the first trajectory and the second trajectory as a set of diverse trajectories. The signal processing system 1102 can identify the first trajectory and the second trajectory using minimum-violation planning, model predictive control, or a machine learning model.

The signal processing system 1102 can identify the set of diverse trajectories by filtering the first set of trajectories based on the hierarchical plurality of rules. In some cases, the signal processing system 1102 prunes trajectories from the first set of trajectories based on a likelihood that a trajectory corresponds to another trajectory of the first set of trajectories (e.g., based on a similarity to other trajectories of the first set of trajectories). In other cases, the signal processing system 1102 prunes trajectories from the first set of trajectories that violate the same rule such that a single trajectory violates a given rule or less than (or equal to) a threshold number of trajectories (e.g., 3) violate a given rule.

The signal processing system 1102 may identify the set of diverse trajectories based on determining that the trajectories of the set of diverse trajectories violate different behavioral rules. For example, the signal processing system 1102 may determine that the first trajectory violates a second behavioral rule with a second priority and the second trajectory violates a third, different behavioral rule with a third priority. In some cases, the signal processing system 1102 identifies the set of diverse trajectories based on determining that the set of diverse trajectories violates different groups of behavioral rules. In some cases, the first trajectory violates a second rule of the hierarchical plurality of rules and the second trajectory violates a third rule of the hierarchical plurality of rules. The second rule and/or the third rule may be associated with a particular priority based on the hierarchical plurality of rules. In some cases, one or more of the first trajectory or the second trajectory do not violate a rule of the hierarchical plurality of rules.

The signal processing system 1102 can identify the set of diverse trajectories based on determining that the trajectories of the set of diverse trajectories violate rules with different priorities. For example, the signal processing system 1102 may identify that the second trajectory violates a rule associated with a first priority and the third trajectory violates a rule with a second priority.

The signal processing system 1102 can identify the set of diverse trajectories based on determining that the trajectories of the set of diverse trajectories are spatially, temporally, or spatial-temporally diverse. For example, the signal processing system 1102 may determine that the first trajectory and the second trajectory are spatially separated or temporally separated by a threshold value (e.g., five meters, five seconds, etc.).

The signal processing system 1102 can identify the set of diverse trajectories by identifying that the trajectories of the set of diverse trajectories violate rules with lower priorities as compared to other rules violated by other trajectories. The signal processing system 1102 can identify a predetermined number of trajectories that violate rules with a lowest priority as compared to other rules violated by other potential trajectories. For example, the signal processing system 1102 may identify two trajectories by determining a first trajectory that violates a rule with a priority lower than a priority of all or a portion of other rules violated by other potential trajectories and a second trajectory that violates a rule with a priority lower than a priority of all or a portion of other rules violated by other potential trajectories other than the first trajectory.

At block 1406, the signal processing system 1102 generates a second set of trajectories from a second pose located at an end of the first trajectory and a third set of trajectories from a third pose located at an end of the second trajectory. The signal processing system 1102 can generate the second set of trajectories and the third set of trajectories responsive to identifying the first trajectory and the second trajectory. The second set of trajectories may represent operation of the vehicle from the second pose and the third set of trajectories may represent operation of the vehicle from the third pose.

In some embodiments, to generate the sets of trajectories, the signal processing system 1102 applies vehicle dynamics (e.g., a speed of the vehicle, an orientation of the vehicle, an acceleration of the vehicle, etc.) to trajectories. For example, the signal processing system may generate the second set of trajectories by applying first vehicle dynamics associated with the second pose to trajectories associated with a location of the second pose and generate the third set of trajectories by applying second vehicle dynamics associated with the third pose to trajectories associated with a location of the third pose.

In some cases, the signal processing system 1102 iteratively repeats the path generation process. For example, the path generation process may include any number of planning steps. All or a portion of the planning steps may include iteratively identifying a set of trajectories maintained in a prior planning step, identifying a set of trajectories that are diverse from the set of trajectories, generating additional sets of trajectories for all or some of the set of diverse trajectories, and maintaining all or some of the additional sets of trajectories. In some cases, the signal processing system 1102 repeats the path generation process to identify multiple paths. The signal processing system 1102 may combine the multiple paths to determine a route.

At block 1408, the signal processing system 1102 identifies a third trajectory based on the second set of trajectories and the third set of trajectories. The third trajectory may violate a first rule (e.g., a first behavioral rule) of a hierarchical plurality of rules. The first rule may be associated with a first priority (based on the hierarchical plurality of rules). The signal processing system 1102 can identify the third trajectory based on determining that the first priority is less than a priority of rules violated by other trajectories of the second set of trajectories and the second set of trajectories. In some cases, the signal processing system 1102 identifies the third trajectory based on determining that the first priority is less than the priority of all or some of the other rules violated by all or some of the other trajectories of the second set of trajectories and the third set of trajectories.

In some cases, the third trajectory branches from the particular trajectory (e.g., the first trajectory) that violates a rule with a higher priority than another trajectory (e.g., the second trajectory). The signal processing system 1102 can identify the third trajectory based on determining that trajectories that branch from the another trajectory cause a violation of a rule that has a higher priority than rules violated by the third trajectory or the trajectory from which the third trajectory branches.

The signal processing system 1102 can identify the third trajectory based on determining that a goal pose has been reached (e.g., a destination) or that a timeout period has been reached for determining the path and/or route or generating the graph.

At block 1410, the signal processing system 1102 determines a path for the vehicle based on the third trajectory. The path may include a sequence of trajectories from an initial pose to an end pose. The path may include the third trajectory and one of the first trajectory or the second trajectory. In some cases, the path includes one or more trajectories between the first trajectory or the second trajectory and the third trajectory. The signal processing system 1102 can determine a route for the vehicle using the path. For example, the route may include one or more paths.

The signal processing system 1102 can route the path (or a route that includes the path) to a computing device. For example, the signal processing system 1102 can route the path to a computing device for testing and/or training, for navigation of a vehicle, etc. The signal processing system 1102 can transmit a message to the control system of the vehicle to operate (cause operation of the vehicle based on the path). In some cases, the signal processing system 1102 causes display of the path via a display of a computing device. For example, the signal processing system 1102 can cause display of a geographical map that identifies a location of the path. Further, the signal processing system 1102 can cause display of an indicator of the rules violated by the path. In some cases, the signal processing system 1102 generates a graph that identifies the path. The signal processing system 1102 can cause display of the graph.

It will be understood that the routine 1400 can be repeated multiple times using different location data (e.g., different destinations, different initial poses, etc.) and/or different objects in an environment of the vehicle. In some cases, the signal processing system 1102 iteratively repeats the routine 1400 for multiple vehicles within the same environment. Further, the signal processing system 1102 can repeat the routine 1400 for the same vehicle during different time periods.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method comprising:
generating, with at least one processor, for a vehicle located at a first pose, a first set of trajectories that are separate and distinct and flow directly from the first pose to different poses;
pruning, with the at least one processor, one or more trajectories from the first set of trajectories based on a difference between behavioral rules, of a hierarchical plurality of rules, violated by trajectories of the first set of trajectories, a difference between priorities associated with behavioral rules, of a hierarchical plurality of rules, violated by trajectories of the first set of trajectories, or a difference between trajectories of the first set of trajectories;
determining, with the at least one processor, that a difference between a first trajectory of the first set of trajectories and a second trajectory of the first set of trajectories satisfies a threshold, wherein the first trajectory starts at the first pose and ends at a second pose, and wherein the second trajectory starts at the first pose and ends at a third pose;
responsive to determining that the difference between the first trajectory and the second trajectory satisfies the threshold, generating, with the at least one processor, a second set of trajectories for the vehicle from the second pose and a third set of trajectories for the vehicle from the third pose, wherein the second set of trajectories are separate and distinct and flow directly from the second pose to different poses, and wherein the third set of trajectories are separate and distinct and flow directly from the third pose to different poses;
identifying, with the at least one processor, a third trajectory based on the second set of trajectories and the third set of trajectories, wherein the third trajectory violates a first behavioral rule of the hierarchical plurality of rules,
wherein the first behavioral rule is associated with a first priority, and
wherein the first priority is a lower priority than respective priorities of behavioral rules violated by other trajectories of the second set of trajectories and the third set of trajectories; and
determining, with the at least one processor, a path from the first pose for the vehicle to operate along based on the third trajectory.

2. The method of claim 1, wherein: the first trajectory violates a second behavioral rule of the hierarchical plurality of rules, wherein the second behavioral rule is associated with a second priority, wherein the second trajectory violates a third behavioral rule of the hierarchical plurality of rules, and wherein the third behavioral rule is associated with a third priority.

3. The method of claim 2, wherein: the second priority is less than the third priority, and wherein the third trajectory comprises a trajectory from the third set of trajectories.

4. The method of claim 1, wherein: the first set of trajectories represent operation of the vehicle from the first pose, wherein the second set of trajectories represent operation of the vehicle from the second pose, and wherein the third set of trajectories represent operation of the vehicle from the third pose.

5. The method of claim 1, further comprising:
generating a graph, wherein the graph identifies the path.

6. The method of claim 1, further comprising:
transmitting, by the at least one processor, a message to a control system of the vehicle to operate the vehicle based on the path.

7. The method of claim 1, wherein determining that the difference between the first trajectory and the second trajectory satisfies the threshold comprises determining that a difference between a second priority and a third priority satisfies the threshold, wherein the second priority is associated with a second behavioral rule violated by the first trajectory, and wherein the third priority is associated with a third behavioral rule violated by the second trajectory.

8. The method of claim 1, further comprising:
determining a likelihood of each trajectory of the first set of trajectories corresponding to the first trajectory, wherein pruning the one or more trajectories from the first set of trajectories is further based on the likelihood of each trajectory of the first set of trajectories corresponding to the first trajectory.

9. The method of claim 1, wherein pruning the one or more trajectories from the first set of trajectories comprises pruning one or more trajectories from the first set of trajectories violate a same behavioral rule as an additional trajectory of the first set of trajectories.

10. The method of claim 1, wherein: the first trajectory violates a second behavioral rule of the hierarchical plurality of rules, wherein the second trajectory violates a third behavioral rule of the hierarchical plurality of rules, wherein the second behavioral rule identifies that the vehicle is to maintain a distance from a parked vehicle, and wherein the third behavioral rule identifies that the vehicle is to reach a destination or that the vehicle is to stay in a lane.

11. The method of claim 1, further comprising identifying the first trajectory and the second trajectory using at least one of minimum-violation planning, a model predictive control, or a machine learning model.

12. The method of claim 1, wherein each behavioral rule of the hierarchical plurality of rules corresponds to a respective priority with respect to each other behavioral rule of the hierarchical plurality of rules.

13. The method of claim 1, further comprising determining the difference between the first trajectory and the second trajectory.

14. The method of claim 1, wherein the first trajectory violates a second behavioral rule of the hierarchical plurality of rules and the second trajectory violates a third behavioral rule of the hierarchical plurality of rules,
wherein determining that the difference between the first trajectory and the second trajectory satisfies the threshold comprises:
determining that a difference between a first grouping of behavioral rules and a second grouping of behavioral rules satisfies the threshold, wherein the second behavioral rule corresponds to the first grouping of behavioral rules and the third behavioral rule corresponds to the second grouping of behavioral rules, wherein each behavioral rule of the first grouping of behavioral rules is associated with a second priority and each behavioral rule of the second grouping of behavioral rules is associated with a third priority.

15. The method of claim 1,
wherein determining that the difference between the first trajectory and the second trajectory satisfies the threshold comprises:
determining that a spatial difference between the first trajectory and the second trajectory satisfies the threshold.

16. The method of claim 1,
wherein determining that the difference between the first trajectory and the second trajectory satisfies the threshold comprises:
determining that a temporal difference between the first trajectory and the second trajectory satisfies the threshold.

17. The method of claim 1, wherein: the first set of trajectories comprises the first trajectory, the second trajectory, and a fourth trajectory, wherein the first trajectory violates a second behavioral rule of the hierarchical plurality of rules, wherein the second trajectory violates a third behavioral rule of the hierarchical plurality of rules, wherein the fourth trajectory violates a fourth behavioral rule of the hierarchical plurality of rules, wherein the second behavioral rule is associated with a second priority, wherein the third behavioral rule is associated with a third priority, wherein the fourth behavioral rule is associated with a fourth priority, the method further comprising:
determining the second priority is less than the third priority and the fourth priority;
determining the third priority is less than the fourth priority; and
identifying the first trajectory and the second trajectory based on determining the second priority is less than the third priority and the fourth priority and determining the third priority is less than the fourth priority.

18. The method of claim 1, wherein a fourth set of trajectories comprises the second set of trajectories and the third set of trajectories, the method further comprising:
updating the fourth set of trajectories, for n iterations, wherein updating the fourth set of trajectories comprises:
iteratively identifying a subset of trajectories from the fourth set of trajectories, wherein the subset of trajectories violate behavioral rules with different priorities;

generating an additional set of trajectories for the vehicle for each trajectory of the subset of trajectories; and updating the fourth set of trajectories to include the additional set of trajectories for each trajectory of the subset of trajectories, wherein n can be any number, and wherein identifying, with the at least one processor, the third trajectory is further based on updating the fourth set of trajectories.

19. The method of claim 1, wherein the first trajectory violates a second behavioral rule of a hierarchical plurality of rules, wherein the second behavioral rule is associated with a second priority, wherein the second trajectory violates a third behavioral rule of the hierarchical plurality of rules, wherein the third behavioral rule is associated with a third priority, and wherein the difference between the first trajectory and the second trajectory comprises:
 a difference between the second behavioral rule and the third behavioral rule;
 a difference between the second priority and the third priority;
 a spatial difference between the first trajectory and the second trajectory;
 a temporal difference between the first trajectory and the second trajectory; or
 a spatio-temporal difference between the first trajectory and the second trajectory.

20. The method of claim 1, wherein the threshold comprises:
 a threshold difference in behavioral rules;
 a threshold behavioral rule;
 a threshold difference in priority;
 a threshold priority;
 a threshold spatial distance;
 a threshold temporal distance; or
 a threshold spatio-temporal distance.

21. At least one non-transitory storage media storing instructions that, when executed by a computing system comprising a processor, cause the computing system to:
 generate, for a vehicle located at a first pose, a first set of trajectories that are separate and distinct and flow directly from the first pose to different poses;
 prune one or more trajectories from the first set of trajectories based on a difference between behavioral rules, of a hierarchical plurality of rules, violated by trajectories of the first set of trajectories, a difference between priorities associated with behavioral rules, of a hierarchical plurality of rules, violated by trajectories of the first set of trajectories, or a difference between trajectories of the first set of trajectories;
 determine that a difference between a first trajectory of the first set of trajectories and a second trajectory of the first set of trajectories satisfies a threshold, wherein the first trajectory starts at the first pose and ends at a second pose, and wherein the second trajectory starts at the first pose and ends at a third pose;
 responsive to determining that the difference between the first trajectory and the second trajectory satisfies the threshold, generate a second set of trajectories for the vehicle from the second pose and a third set of trajectories for the vehicle from the third pose, wherein the second set of trajectories are separate and distinct and flow directly from the second pose to different poses, and wherein the third set of trajectories are separate and distinct and flow directly from the third pose to different poses;
 identify a third trajectory based on the second set of trajectories and the third set of trajectories,
  wherein the third trajectory violates a first behavioral rule of the hierarchical plurality of rules, wherein the first behavioral rule is associated with a first priority, and
  wherein the first priority is a lower priority than respective priorities of behavioral rules violated by other trajectories of the second set of trajectories and the third set of trajectories; and
 determine a path from the first pose for the vehicle to operate along based on the third trajectory.

22. A system, comprising:
 at least one processor, and
 at least one non-transitory storage media storing instructions that, when executed by the at least one processor, cause the at least one processor to:
  generate, for a vehicle located at a first pose, a first set of trajectories that are separate and distinct and flow directly from the first pose to different poses;
  prune one or more trajectories from the first set of trajectories based on a difference between behavioral rules, of a hierarchical plurality of rules, violated by trajectories of the first set of trajectories, a difference between priorities associated with behavioral rules, of a hierarchical plurality of rules, violated by trajectories of the first set of trajectories, or a difference between trajectories of the first set of trajectories;
  determine that a difference between a first trajectory of the first set of trajectories and a second trajectory of the first set of trajectories satisfies a threshold, wherein the first trajectory starts at the first pose and ends at a second pose, and wherein the second trajectory starts at the first pose and ends at a third pose;
  responsive to determining that the difference between the first trajectory and the second trajectory satisfies the threshold, generate a second set of trajectories for the vehicle from the second pose and a third set of trajectories for the vehicle from the third pose, wherein the second set of trajectories are separate and distinct and flow directly from the second pose to different poses, and wherein the third set of trajectories are separate and distinct and flow directly from the third pose to different poses;
  identify a third trajectory based on the second set of trajectories and the third set of trajectories,
   wherein the third trajectory violates a first behavioral rule of the hierarchical plurality of rules,
   wherein the first behavioral rule is associated with a first priority, and
   wherein the first priority is a lower priority than respective priorities of behavioral rules violated by other trajectories of the second set of trajectories and the third set of trajectories; and
  determine a path from the first pose for the vehicle to operate along based on the third trajectory.

* * * * *

UNITED STATES PATENT AND TRADEMARK OFFICE
CERTIFICATE OF CORRECTION

| | | |
|---|---|---|
| PATENT NO. | : 12,420,776 B2 | Page 1 of 1 |
| APPLICATION NO. | : 17/970957 | |
| DATED | : September 23, 2025 | |
| INVENTOR(S) | : Shakiba Yaghoubi et al. | |

It is certified that error appears in the above-identified patent and that said Letters Patent is hereby corrected as shown below:

In the Specification

Column 1, Line 43, delete "trajectory generation." and insert -- trajectory generation; --.

Column 12, Line 3, delete "interface, of 62 a coaxial" and insert -- interface, a coaxial --.

Column 18, Line 64, delete "satisfy rule avoid" and insert -- satisfy rule 5: avoid --.

In the Claims

Column 41, Claim 2, Line 12, delete "1, wherein: the" and insert -- 1, wherein the --.

Column 41, Claim 3, Line 19, delete "2, wherein: the" and insert -- 2, wherein the --.

Column 41, Claim 4, Line 22, delete "1, wherein: the" and insert -- 1, wherein the --.

Column 41, Claim 10, Line 54, delete "1, wherein: the" and insert -- 1, wherein the --.

Column 42, Claim 17, Line 38, delete "1, wherein: the" and insert -- 1, wherein the --.

Signed and Sealed this
Ninth Day of December, 2025

John A. Squires
*Director of the United States Patent and Trademark Office*